United States Patent
Sato

(10) Patent No.: US 7,122,988 B2
(45) Date of Patent: Oct. 17, 2006

(54) ROTATION DRIVE DEVICE AND ROTATION DRIVE METHOD

(75) Inventor: Hideaki Sato, Tosu (JP)

(73) Assignee: Tokyo Electron Limited, Tokyo-To (JP)

( * ) Notice: Subject to any disclaimer, the term of this patent is extended or adjusted under 35 U.S.C. 154(b) by 0 days.

(21) Appl. No.: 10/526,670

(22) PCT Filed: Sep. 12, 2003

(86) PCT No.: PCT/JP03/11732

§ 371 (c)(1),
(2), (4) Date: Mar. 4, 2005

(87) PCT Pub. No.: WO2004/025820

PCT Pub. Date: Mar. 25, 2004

(65) Prior Publication Data

US 2006/0138985 A1  Jun. 29, 2006

(30) Foreign Application Priority Data

Sep. 13, 2002 (JP) ............................. 2002-267770

(51) Int. Cl.
*G05B 21/00* (2006.01)
(52) U.S. Cl. ...................... 318/567; 318/445; 318/453; 318/454; 700/121; 700/115
(58) Field of Classification Search ...................... None
See application file for complete search history.

(56) References Cited

U.S. PATENT DOCUMENTS 3,463,984 A * 8/1969 Ross et al. .................. 318/127
3,852,731 A * 12/1974 Hollands ..................... 340/663
4,027,246 A * 5/1977 Caccoma et al. ........... 700/121

(Continued)

FOREIGN PATENT DOCUMENTS

JP  04-161096  6/1992

(Continued)

OTHER PUBLICATIONS

Machine translation, Japanese Patent application JP 11-308894, Published May 11, 1999, Yaskawa Electric Corp.*

(Continued)

*Primary Examiner*—Lincoln Donovan
*Assistant Examiner*—Robert W. Horn
(74) *Attorney, Agent, or Firm*—Smith, Gambrell & Russell, LLP

(57) ABSTRACT

This rotation driving apparatus includes a torque generating circuit 72 for generating a torque of a servo motor 30 with voltage supply from a power source 71 and a motor control circuit 73 for controlling rotation of the motor. In the torque generating circuit 72, a condenser 76 is arranged to detect a level of the supplied voltage and a period of voltage drop. A voltage-drop information detected by the condenser 76 can be transmitted to a host controller 70. The host controller 70 previously memorizes a power-recovery information having a voltage drop and a time under an instantaneous blackout capable of recovering within a predetermined period and a rotation control pattern information of the motor corresponding to the power-recovery information and further compares the voltage-drop information, the power-recovery information and the rotation control pattern information of the motor with each other. Based on a control signal, the controller 70 controls the rotation of the servo motor 30. Then, by controlling the rotation in correspondence with the voltage drop during the driving of the motor, it is carried out to suppress increasing of a driving period, improving the throughput and restricting vibration due to a rotational standstill of the motor by the voltage drop.

18 Claims, 12 Drawing Sheets

U.S. PATENT DOCUMENTS

| | | | | |
|---|---|---|---|---|
| 4,031,463 | A * | 6/1977 | Norberg | 324/76.16 |
| 4,461,003 | A * | 7/1984 | Tamaki | 714/22 |
| 4,481,449 | A * | 11/1984 | Rodal | 318/375 |
| 4,604,530 | A * | 8/1986 | Shibuya | 307/66 |
| 4,650,976 | A * | 3/1987 | Hiraishi | 235/379 |
| 4,678,063 | A * | 7/1987 | Kitaoka et al. | 187/296 |
| 4,751,521 | A * | 6/1988 | Ogihara et al. | 346/82 |
| 4,767,970 | A * | 8/1988 | Rodal | 318/375 |
| 4,831,469 | A * | 5/1989 | Hanson et al. | 360/75 |
| 4,851,985 | A * | 7/1989 | Burror et al. | 700/79 |
| 4,862,142 | A * | 8/1989 | Knight | 340/522 |
| 5,085,294 | A * | 2/1992 | Iwata | 187/394 |
| 5,422,808 | A * | 6/1995 | Catanese et al. | 700/79 |
| 5,426,355 | A * | 6/1995 | Zweighaft | 318/364 |
| 5,519,295 | A * | 5/1996 | Jatnieks | 318/453 |
| 5,600,217 | A * | 2/1997 | Bartlett | 318/434 |
| 5,673,194 | A * | 9/1997 | Cipelletti et al. | 700/115 |
| 5,841,964 | A * | 11/1998 | Yamaguchi | 714/45 |
| 5,862,054 | A * | 1/1999 | Li | 700/121 |
| 5,929,578 | A * | 7/1999 | Atarashi | 318/430 |
| 6,026,495 | A * | 2/2000 | Lacombe et al. | 713/340 |
| 6,243,838 | B1 * | 6/2001 | Liu et al. | 714/57 |
| 6,304,005 | B1 * | 10/2001 | Aoki et al. | 307/64 |
| 6,393,334 | B1 * | 5/2002 | Lewis et al. | 700/117 |
| 6,404,348 | B1 * | 6/2002 | Wilfong | 340/657 |
| 6,434,957 | B1 * | 8/2002 | Nishizuka et al. | 62/175 |
| 6,533,074 | B1 * | 3/2003 | Tominaga et al. | 187/290 |
| 6,545,443 | B1 * | 4/2003 | Kushida | 318/727 |
| 6,809,494 | B1 * | 10/2004 | Hattori et al. | 318/625 |
| 6,862,688 | B1 * | 3/2005 | Ochiai | 714/2 |
| 6,909,372 | B1 * | 6/2005 | Iwanaga et al. | 340/660 |
| 6,909,927 | B1 * | 6/2005 | Nguyen | 700/110 |
| 6,922,028 | B1 * | 7/2005 | Akizuki | 318/254 |
| 6,958,589 | B1 * | 10/2005 | Kawaji et al. | 318/802 |
| 6,961,201 | B1 * | 11/2005 | Odai et al. | 360/73.03 |
| 6,972,541 | B1 * | 12/2005 | Matsushiro et al. | 318/801 |

FOREIGN PATENT DOCUMENTS

| | | |
|---|---|---|
| JP | 06-084739 | 3/1994 |
| JP | 9-500519 | 1/1997 |
| JP | 2723764 | 11/1997 |
| JP | 10-150014 | 6/1998 |
| JP | 11-308894 | 11/1999 |

OTHER PUBLICATIONS

Machine translation, Japanese Patent JP 273764, Published Mar. 25, 1994, Hitachi, Ltd.*
Computer-generated translation of JP 10-150014.
Computer-generated translation of JP 2723764.
Patent Abstract of JP10-150014.

* cited by examiner

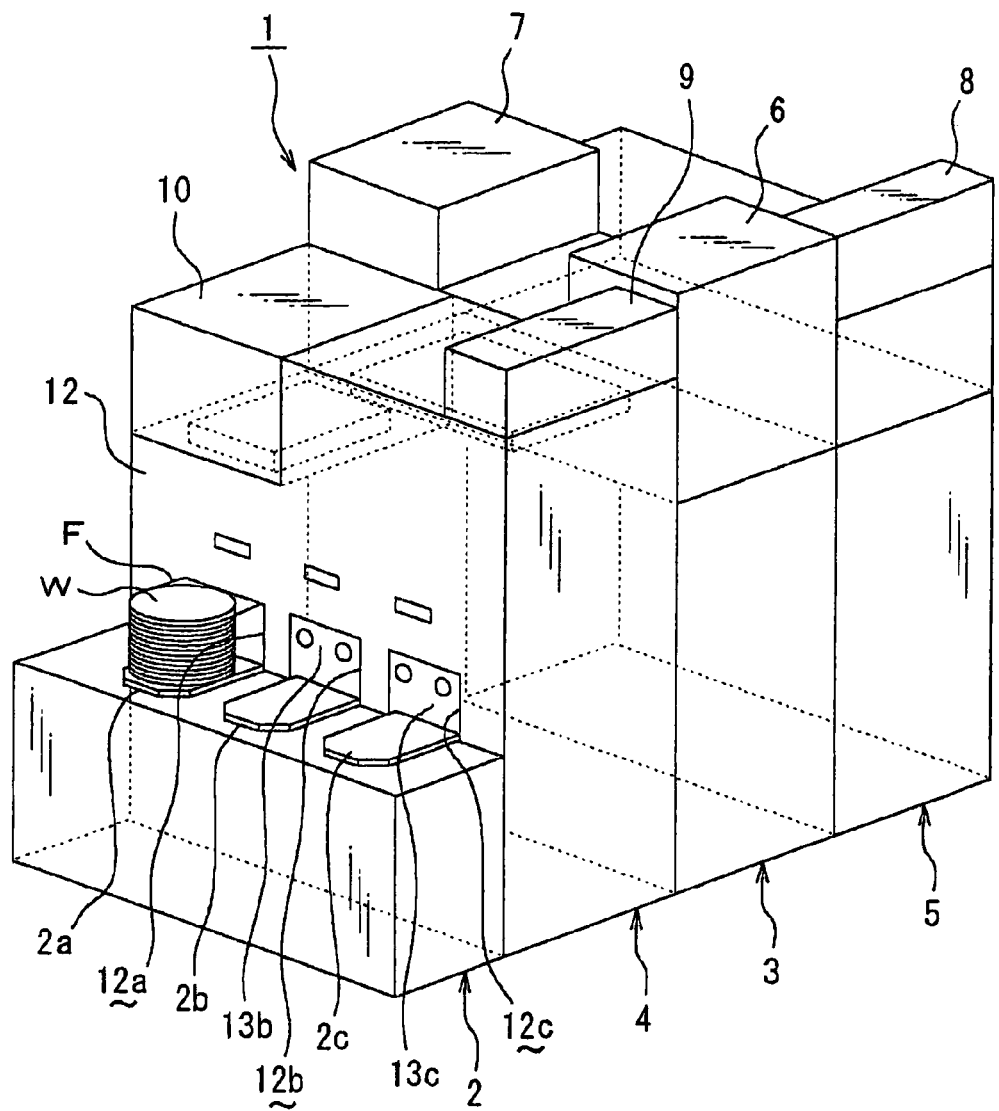
F I G. 1

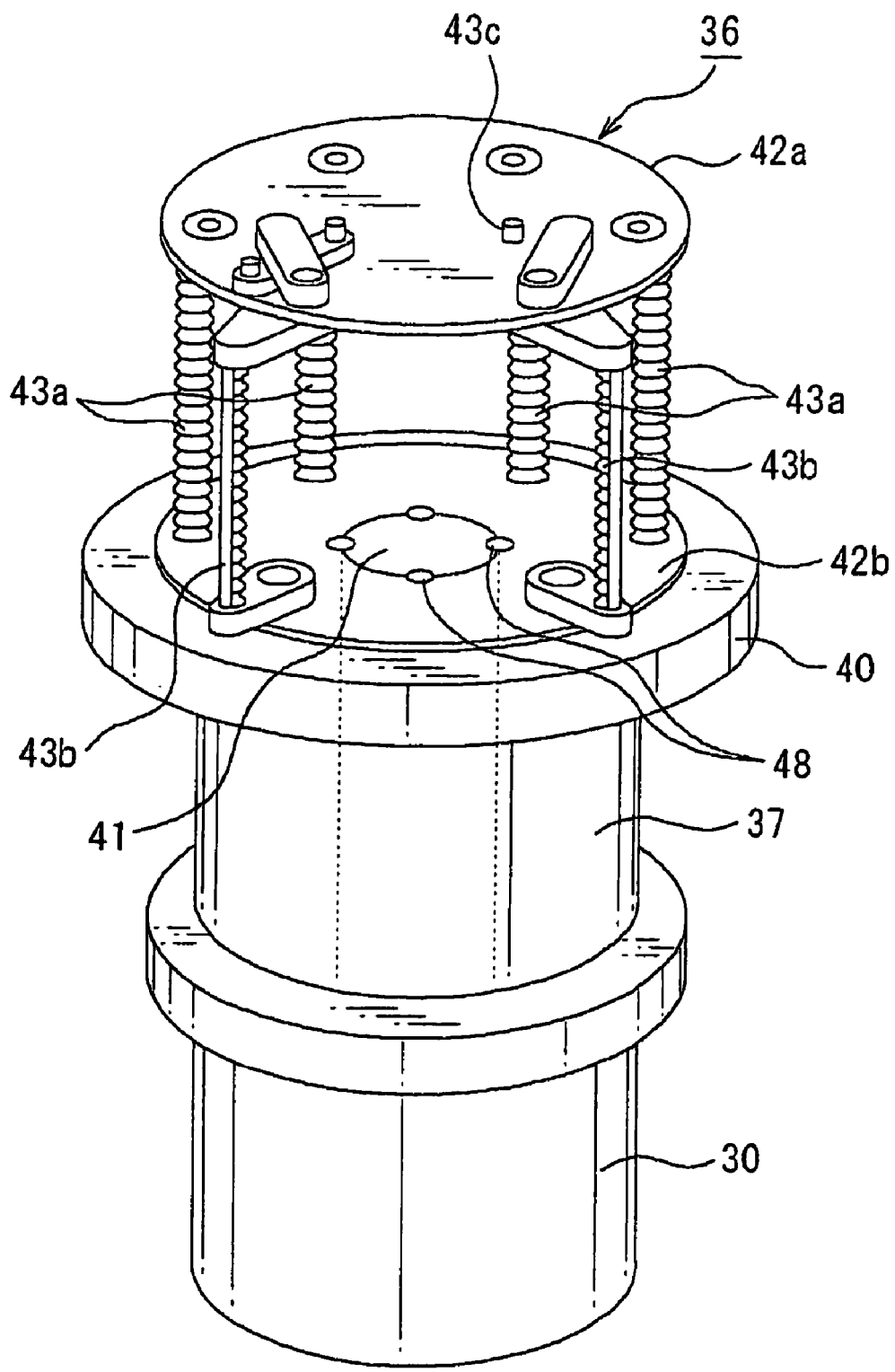
F I G. 5

ROTATION DRIVE DEVICE AND ROTATION DRIVE METHOD

TECHNICAL FIELD

This invention relates to a rotation driving apparatus and a rotation driving method, more in detail, to the rotation driving apparatus and the rotation driving method that can respond to a voltage drop during driving of the apparatus.

BACKGROUND OF ART

For example, a manufacturing apparatus for semiconductor devices transfers an object to be processed, such as semiconductor wafer and LCD substrate (the object will be referred "wafer etc.", after) from a loading/unloading part to a processing part, e.g. a cleaning/drying part by using a transport mechanism. At the cleaning/drying part, a wafer etc. held by a rotor equipped with a rotating mechanism is cleaned in order to remove contaminations, such as particles, organic contaminants and metallic impurities, and post-etching polymers from the wafer etc. with supply of designated chemical liquid, deionized water or the like. After the removal, the wafer etc. is dried by removing droplets therefrom with supply of inert gas, for example, nitrogen (N2) gas, volatile and hydrophilic IPA vapor, etc. Subsequently, an operation to pick up the wafer etc. from the cleaning/drying part and further transfer the wafer etc. to the loading/unloading part by the transport mechanisms is performed.

In the semiconductor manufacturing apparatus like this, of course, a motor (rotation driving apparatus) driven by a supply voltage from a power source is used in a rotor, as a driving source for the transport mechanism.

By the way, during the operation of the apparatus, there arises a situation that the supply voltage for the motor drops. In such a situation, the processing is immediately suspended for purpose of protecting the rotor and the transport mechanism. However, the standstill of the processing may cause the quality of a wafers etc. to deteriorate.

Therefore, there has been hitherto adopted a method that if the supply voltage drops due to power blackout etc., then a processing condition is memorized by a power source supplied from power reserving means and further, when the voltage drop is recovered, the processing operation is restarted while referring to data of the memorized processing condition. This method is disclosed in e.g. Japanese Patent Publication No. 2723764, paragraph Nos. 0011, 0024 to 0028 and 0031 and FIGS. 4 and 5. Additionally, there is also known a method that when a power blackout occurs, the transportation of wafers etc. or the processing operation is maintained by an emergency power from an emergency power source. This method is disclosed in e.g. Japanese Patent Publication (Kokai) No. 10-150014, paragraph Nos. 0033, 0040 and 0041 and FIG. 5.

In the above-mentioned method that the processing condition is memorized by the power source supplied from the power reserving means when the supply voltage drops and that the processing operation is maintained while referring to data of the memorized processing condition when the voltage drop is recovered, however, there are problems to be solved. That is, since the operation (driving) of the apparatus is once stopped when the supply voltage drops and the operation (driving) is restarted when the voltage drop is recovered, the driving period of the apparatus is increased to cause reduction of its throughput. Additionally, if stopping the rotation of a driving part of the apparatus during, especially, its accelerating rotation or high-speed rotation, the wafers etc. may be damaged due to vibration of the apparatus. Similarly, the other method of continuing the processing operation with supply of the emergency power from the emergency power source at a power blackout has problems although there is no problem of increasing the processing period remarkably. That is, since the driving of the apparatus comes to a temporary standstill in changing a main power supply to the emergency power source, the driving period is increased as much to cause reduction of the throughput. Additionally, as mentioned above, if stopping the rotation of a driving part of the apparatus during, especially, its accelerating rotation or high-speed rotation, the wafers etc. may be damaged due to vibration of the apparatus.

By the way, such a situation that a supply voltage drops is not always derived from a power blackout only. The situation may be derived from an instantaneous blackout where the voltage drops instantaneously and the power is recovered (redelivered) subsequently. Note that, the apparatus is usually standardized so as to cope with such an instantaneous blackout.

Also in case of such an instantaneous blackout, the standstill of the apparatus driving causes increasing of the driving period and reduction of the throughput. Further, there is a problem that a standstill in rotational drive causes the wafers etc. to be damaged due to vibration.

Under the above circumstance, the object of the present invention is to suppress increasing of the driving period by controlling the rotation of an apparatus corresponding to a voltage drop during driving of the apparatus, to improve the throughput of the apparatus and to suppress vibration of the apparatus due to its standstill in rotation in the voltage drop.

DISCLOSURE OF THE INVENTION

The first feature of the present invention resides in the provision of a rotation driving apparatus having a motor at least rotating at a high speed and a low speed, a torque generating circuit for generating a torque of the motor by a supply voltage from a power source, a motor control circuit for controlling rotation of the motor, rotation detector for detecting a rotating speed of the motor and transmitting a detection signal to the motor control circuit and controller for delivering the rotating speed of the motor and a number of revolutions thereof to and from the motor control circuit, wherein the torque generating circuit includes voltage detector for detecting a level of the supply voltage and a period of voltage drop, the voltage detector transmitting a voltage-drop information to the controller, the controller memorizes a power-recovery information having a voltage drop and a period thereof under an instantaneous blackout recoverable within a predetermined period and a rotation-control pattern information of the motor corresponding to the power-recovery information, in advance, and the controller controls the rotation of the motor upon comparing the voltage-drop information, the power-recovery information and the rotation-control pattern information of the motor with each other.

Therefore, since the rotation driving apparatus can detect a voltage drop during the rotation of the motor and further control the rotation of the motor corresponding to the voltage drop when it comes from the instantaneous blackout, it is possible to suppress increasing of the driving period of the motor and also possible to improve throughput of the apparatus.

The second feature of the present invention resides in that when the voltage detector detects a voltage drop during the accelerating rotation of the motor, the controller outputs control signals of decelerating rotation of the motor and subsequently rotating the motor at a constant speed.

Thus, when a voltage drop occurs during the accelerating rotation of the motor, the rotation of the motor is once decelerated and subsequently maintained at a constant speed, based on the control signals of the control means. It is possible to suppress occurrence of vibrations due to standstill of the motor. Accordingly, for example, in application of the rotation driving apparatus to a processing apparatus for holding objects to be processed in rotation, it becomes possible to reduce damage on the objects to be processed.

The third feature of the present invention resides in that, setting up a rotation-control pattern of the motor having ranges of: an accelerating rotation; a constant high-speed rotation; and a decelerating rotation, when the voltage detector detects a voltage drop during the accelerating rotation of the motor, the controller outputs control signals of: decelerating rotation of the motor; next rotating the motor at a constant speed; and after the power recovery, accelerating rotation of the motor.

Thus, when a voltage drop occurs during the accelerating rotation of the motor, the rotation of the motor is once decelerated and subsequently maintained at a constant speed, based on the control signals of the control means. After the power recovery, the rotation of the motor is accelerated again, based on the control signals of the control means. Therefore, it is possible to suppress occurrence of vibrations due to standstill of the motor and also possible to accomplish the rotation control of the motor in accordance with the rotation-control pattern of the motor established in advance. Accordingly, for example, in application of the rotation driving apparatus to a processing apparatus for holding objects to be processed in rotation, it becomes possible to reduce damage on the objects to be processed and also possible to improve the quality of the objects to be processed.

The fourth feature of the present invention resides in that, setting up a rotation-control pattern of the motor having ranges of an accelerating rotation, a constant high-speed rotation and a decelerating rotation, when the voltage detector detects a voltage drop during the accelerating rotation of the motor, the controller outputs control signals of: decelerating rotation of the motor; next rotating the motor at a constant speed; and after the power recovery, compensating the accelerating rotation of the motor at the voltage drop.

Thus, when a voltage drop occurs during the accelerating rotation of the motor, the rotation of the motor is once decelerated and subsequently maintained at a constant speed, based on the control signals of the control means. After the power recovery, the accelerating rotation at the voltage drop is compensated, based on the control signals of the control means. It is possible to suppress occurrence of vibrations due to standstill of the motor and also possible to compensate the accelerating rotation at the voltage drop. Accordingly, for example, in application of the rotation driving apparatus to a processing apparatus for holding objects to be processed in rotation, it becomes possible to reduce damage on the objects to be processed and also possible to improve the quality of the objects to be processed.

The fifth feature of the present invention resides in that the accelerating rotation of the motor after the power recovery is carried out by increasing an acceleration rate of the accelerating rotation of the motor in the rotation-control pattern toward a finish time of the accelerating rotation of the motor in the set up rotation-control pattern.

The sixth feature of the present invention resides in that it is set up that the accelerating rotation of the motor after the power recovery conforms to the accelerating rotation of the motor of the set up rotation-control pattern and that a period of the constant high-speed rotation of the motor is equal to a period of the constant high-speed rotation of the motor in the set up rotation-control pattern, and a deceleration rate of the decelerating rotation of the motor is increased so that a finish time of the decelerating rotation of the motor coincides with a finish time of the decelerating rotation of the motor in the set up rotation-control pattern.

The seventh feature of the present invention resides in that the accelerating rotation of the motor after the power recovery is maintained to a higher speed than a speed of the constant high-speed rotation of the motor in the set up rotation-control pattern, and after rotating the motor at the higher speed, the motor is decelerated so as to coincide with a finish time of the decelerating rotation of the motor in the set up rotation-control pattern.

Thus, according to the fifth, sixth and the seventh features of the invention, it is possible to improve the reliability of the apparatus further since the control in accordance with the established rotation-control pattern of the motor can be realized by appropriately controlling an acceleration rate of the accelerating rotation after the power recovery, the number of revolutions, period, etc. of the constant high-speed rotation or the decelerating rotation after the power recovery.

The eighth feature of the present invention resides in that when the voltage detector detects a voltage drop during the accelerating rotation of the motor, the controller outputs control signals of: decelerating rotation of the motor; next rotating the motor at a constant speed; and stopping rotation of the motor if time has passed a period of the instantaneous blackout.

Thus, when a voltage drop occurs, the rotation of the motor is once decelerated and subsequently maintained at a constant speed, based on the control signals of the control means. After time has passed a period of the instantaneous blackout, the rotation of the motor is stopped, based on the control signals of the control means. Therefore, at the voltage drop due to the blackout, it is possible to suppress occurrence of vibrations due to standstill of the motor. Additionally, it is also possible to improve the reliability of the apparatus.

The ninth feature of the present invention resides in the provision of a rotation driving apparatus having a motor at least rotating at a high speed and a low speed, a torque generating circuit for generating a torque of the motor by a supply voltage from a power source, a motor control circuit for controlling rotation of the motor, rotation detector for detecting a rotating speed of the motor and transmitting a detection signal to the motor control circuit and controller for delivering the rotating speed of the motor and a number of revolutions thereof to and from the motor control circuit, wherein the torque generating circuit includes voltage detector for detecting a level of the supply voltage and a period of voltage drop, the voltage detector directly transmitting a voltage-drop information to the motor control circuit, the motor control circuit memorizes a power-recovery information having a voltage drop and a period thereof under an instantaneous blackout recoverable within a predetermined period, the controller memorizes a rotation-control pattern information of the motor corresponding to the power-recovery information, the rotation-control pattern information being transmitted to the motor control circuit in advance, and the motor control circuit controls the rotation of the motor upon comparing the voltage-drop information, the power-recovery information and the rotation-control pattern information of the motor with each other.

The tenth feature of the present invention resides in the provision of a rotation driving method for a rotation driving apparatus having a motor at least rotating at a high speed and a low speed, a torque generating circuit for generating a torque of the motor by a supply voltage from a power source, and voltage detector arranged in the torque generating circuit to detect a level of the supply voltage and a period of a voltage drop, comprising the steps of: memorizing a power-recovery information having the voltage drop and the period of the voltage drop under an instantaneous blackout recoverable within a predetermined period and a rotation-control pattern information of the motor corresponding to the power-recovery information, in advance; and getting a voltage-drop information detected by the voltage detector and further controlling the rotation of the motor upon comparing the voltage-drop information, the power-recovery information and the rotation-control pattern information of the motor with each other.

The eleventh feature of the present invention resides in that the step of comparing the voltage-drop information, the power-recovery information and the rotation-control pattern information of the motor with each other, is carried out by controller configured to give and receive both a rotating speed of the motor and number of revolutions thereof to and from motor control circuit for controlling the motor through the torque generating circuit.

The twelfth feature of the present invention resides in that the step of comparing the voltage-drop information, the power-recovery information and the rotation-control pattern information of the motor with each other, is carried out by motor control circuit for controlling the motor through the torque generating circuit.

BRIEF DESCRIPTION OF THE DRAWINGS

FIG. 1 is a perspective view showing a wafer cleaning system using a rotation driving apparatus of the present invention;

FIG. 5 is a perspective view showing a rotor using a servo motor of the present invention;

FIGS. 10A, 10B and 10C are graphs showing one example of driving patterns of the servo motor, in which FIG. 10A shows a relationship between rotating speed and time of a rotation control pattern in a normal state; FIG. 10B shows a relationship between voltage partially containing a voltage drop and time; and FIG. 10C is a graph showing a relationship between rotating speed having the voltage drop and time;

PREFERRED EMBODIMENTS FOR EMBODYING THE INVENTION

Figure 2:
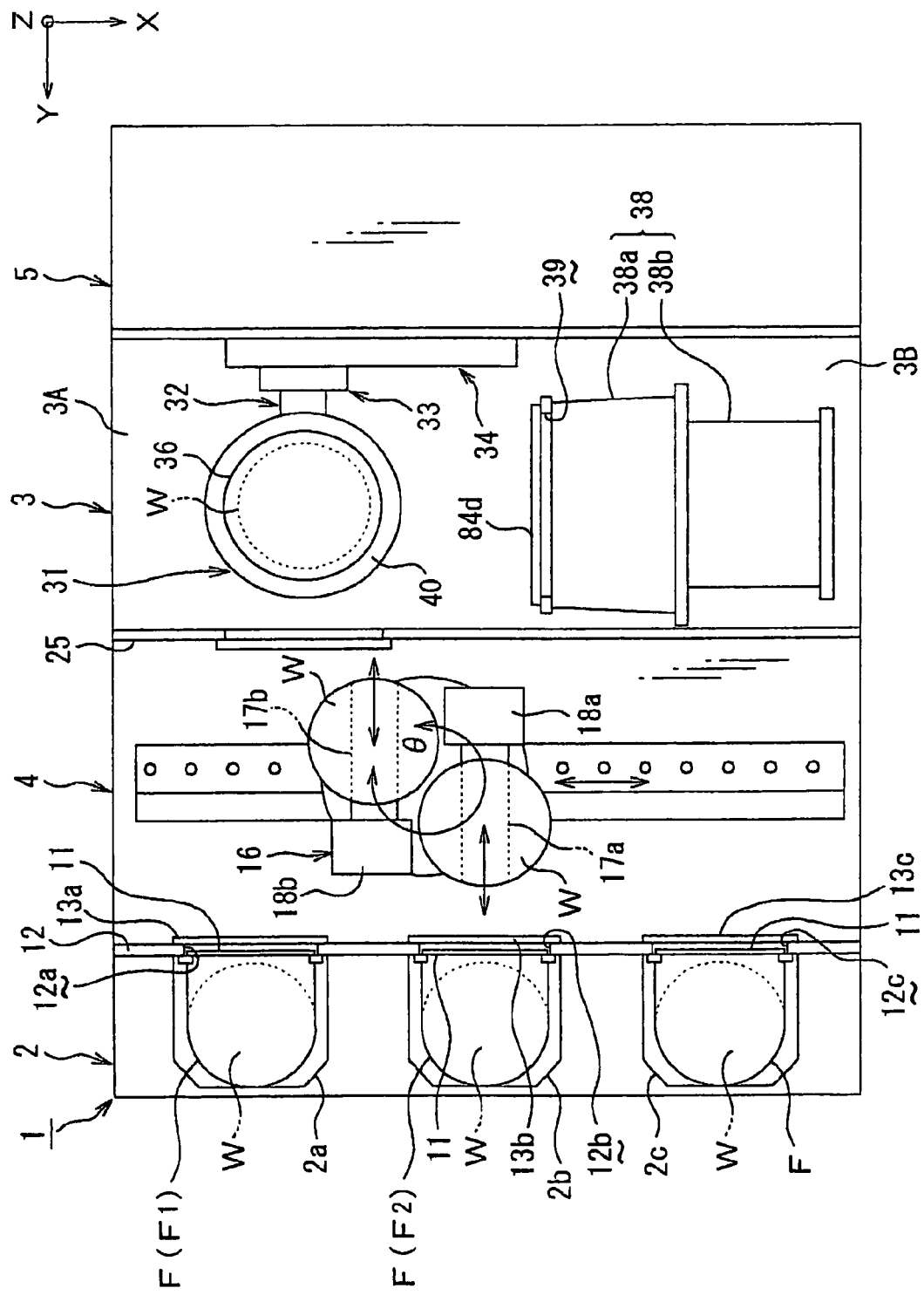
FIG. 2 is a schematic plan view of the cleaning system shown in FIG. 1.

Embodiments of the present invention will be hereinafter described in detail with reference to the accompanying drawings. Here, we explain an application of the rotating driving apparatus of the present invention to a cleaning system that carries out transporting, cleaning and drying processes of semiconductor wafers (which will be referred "wafers" hereinafter) in batch consistently.

As shown in FIGS. 1 to 4, the above cleaning system 1 is composed mainly of a foup loading-and-unloading part 2 provided with foup stages 2a to 2c for mounting foups (Front Opening Unified Pod) F each allowing a plurality of wafers W to be accommodated therein, a cleaning unit 3 for performing a cleaning process to the wafers W, a wafer transfer unit 4 arranged between the foup loading-and-unloading part 2 and the cleaning unit 3 to perform transportation of the wafers W and a chemical storage unit 5 for storing chemical liquid for the cleaning process Further, the cleaning unit 3 is provided, in an upper part thereof, with a power source box 6 for various types of electric driving mechanisms and electronic control units in the cleaning system 1 and a temperature control box 7 for controlling temperatures of respective units forming the cleaning system 1. Again, the wafer transfer unit 4 is provided, in an upper part thereof, with a display box 9 for controlling various types of display panels in the cleaning system 1 and a transfer-mechanism control box 10 accommodating a control unit for a wafer transfer mechanism 16 in the wafer transfer unit 4. Additionally, the chemical storage unit 5 is provided, in its upper part, with a hot exhaust box 8 for collecting exhaust heat from respective boxes and further discharging it.

The foup F to be mounted on the foup stages 2a to 2c is formed so as to enable a plurality of wafers W, for example, twenty-five wafers to be accommodated at predetermined intervals while keeping respective front and back sides of the wafers in a horizontal arrangement. The foup F is provided, on one side thereof, with a wafer loading-and-unloading port for loading and unloading the wafers W. The foup F is equipped with a lid body 11 for opening and shutting the wafer loading-and-unloading port. This lid body 11 is formed so as to be attachable to and detachable from the foup F owing to a lid-body opening-and-closing mechanism 15 mentioned later.

Window parts 12a to 12c are provided in a partition wall 12 between the wafer transfer unit 4 and the foup loading-and-unloading part 2. Peripheral parts of the wafer loading-and-unloading ports formed in the foups F close the window parts 12a to 12c. The foups F are mounted on the foup stages 2a to 2c under condition that the lid-body opening-and-closing mechanisms 15 allow the lid bodies 11 to be detachably attached to the foups (see FIG. 4).

Inside the partition wall 12 (in the wafer transfer unit 4), there are provided, at respective positions of the window parts 12a to 12c, the lid-body opening-and-closing mechanisms 15 comprising shutters 13a to 13c for opening and closing the window parts 12a to 12c and elevating mechanisms for respectively moving the shutters 13a to 13c up and down, for example, air cylinders 14. The lid-body openingand-closing mechanisms 15 are equipped with not-shown lid-body gripping means, such as absorption pads, allowing the lid bodies 11 of the foups F to move up and down together with the shutters 13a to 13c.

In the wafer transfer unit 4, a wafer detecting mechanism 110 for counting the number of wafers W in the foup F is arranged so as to adjoin each of the lid-body opening-and-closing mechanisms 15. This wafer detecting mechanism 110 is equipped with an opaque light sensor 111 composed of an emitter adopting e.g. infrared laser and a receptor. While making the opaque light sensor 111 scan (scanning movement) to a Z-direction (vertical direction) along a guide 112 by means of a motor 113, it is carried out to emit an infrared laser to the wafers W, while reflection lights from the end faces of the wafers W are received. Consequently, it becomes possible to detect the number of wafers W accommodated in the foup F and their accommodated conditions, for example, whether or not the wafers W are accommodated in the foup at predetermined pitches and one by one in substantial parallel with each other, whether or not there are two wafers W laid to overlap each other, whether or not the wafers W are accommodated in the foup obliquely due to their deviation on steps, whether or not there are wafer W projecting from a designated position in the foup F, etc.

Note that, if attaching the wafer detecting mechanism 110 to the wafer transfer mechanism 16 to allow the wafer detecting mechanism 110 to be movable together with the wafer transfer mechanism 16, the wafer detecting mechanism 110 has only to be arranged at only one position. Alternatively, for instance, a sensor for recognizing the number of wafers W in accommodation and a sensor for detecting the condition of wafers W in accommodation may be arranged independently of each other. Moreover, the wafer detecting mechanism 110 may be attached to the lid-body opening-and-closing mechanism 15.

On the ceiling part of the wafer transfer unit 4, a filter fan unit (FFU) 24a is arranged to supply the wafer transfer unit 4 with fresh air. On condition that the window parts 12a to 12c are opened, part of down-flow air from this FFU 24a flows outwardly via the window parts 12a to 12c and flows into the foups F mounted on the foup stages 2a to 2c. Consequently, since the wafers W in the foups F are supplied with fresh air, it is prevented that particles adhere to the wafers W. Note, if an ionizer (not shown) is provided in a lower part of the FFU 24a, then it becomes possible to remove electric charges from the wafers W.

The wafer transfer mechanism 16 in the wafer transfer unit 4 includes a linear driving mechanism 19 having a guide extending to a horizontal X-direction, a plurality of tweezers, for example, twenty-five transfer tweezers 17a, 17b each of which holds one wafer W, holders 18a, 18b which support the transfer tweezers 17a, 17b respectively, a sliding mechanism 20 for moving the transfer tweezers 17a, 17b and the holders 18a, 18b respectively in the horizontal direction (longitudinal direction of the transfer tweezers 17a, 17b), a table 21 allowing the sliding mechanism 21 to rotate in a horizontal plane, a rotating mechanism 22 for rotating (swiveling) the table 21 and an elevating mechanism, for example, an air cylinder 23 for moving an upper part above the rotating mechanism 22 up and down. A servo motor (rotation driving apparatus), which is a rotation driving source for a later-mentioned rotor 36, is available for a rotation driving source for the rotating mechanism 22 etc. constituting this wafer transfer mechanism 16.

As mentioned above, since the wafer transfer mechanism 16 is provided with the transfer tweezers 17a, 17b of two lineages, for example, it is possible to employ the transfer tweezers 17a in order to transfer unprocessed wafers W and employ the other transfer tweezers 17b in order to transfer processed wafers W. Consequently, it is possible to prevent an occurrence of situation that particles etc., which have adhered to the unprocessed wafers W, adhere to the transfer arm and subsequently adhere to the processed wafers W. Additionally, since the provision of the transfer tweezers 17a, 17b of two lineages allows the next unprocessed wafers W to be delivered to the cleaning unit 3 immediately after receiving the processed wafers W from the cleaning unit 3, it is possible to improve the throughput.

In transferring the wafer W between the foup F or the later-mentioned rotor 36 and the transfer tweezers 17a, 17b, it is necessary to move the transfer tweezers 17a, 17b up and down by a predetermined distance. This elevating operation of the transfer tweezers 17a, 17b can be accomplished by the elevating mechanism 23. Alternatively, elevating mechanisms for moving the transfer tweezers 17a, 17b up and down may be provided in the holders 18a, 18b, respectively.

Owing to the wafer transfer mechanism 16 constructed above, the transfer tweezers 17a, 17b can have access to any foup F mounted on the foup stages 2a to 2c and the rotor 36, allowing the wafer W to be transferred between the foup F mounted on the foup stages 2a to 2c and the rotor 36 while keeping the wafer W in horizontal arrangement.

Additionally, since the wafer transfer mechanism 16 has the transfer tweezers 17a, 17b arranged in point symmetry with each other about the rotation center of the table 21, to rotate the table 21 under condition of no extension of the sliding mechanism 20 could narrow a range of tracks of the transfer tweezers 17a, 17b at rotating even if the transfer tweezers 17a, 17b hold the wafers W. Thus, it is possible to reduce a space occupied by the wafer transfer unit 4 in the cleaning system 1.

A partition wall 25 between the wafer transfer unit 4 and the cleaning unit 3 is provided with a window part 25a for transportation of the wafers W. This window part 25a is adapted so as to open and close through a shutter 26 movable up and down due to an elevating mechanism e.g. an air cylinder 26b (see FIGS. 2 to 4). In this case, the shutter 26 is arranged on the side of the wafer transfer unit 4. Alternatively, the shutter may be arranged on the side of the cleaning unit 3.

With the above structure, the presence of the shutter 26a allows an atmosphere in the wafer transfer unit 4 and the same in the cleaning unit 3 to be separated from each other. Therefore, for instance, even if cleaning liquid scatters in the cleaning unit 3 or even if vapor of the cleaning liquid diffuses in the cleaning unit, it is possible to prevent its contamination from expanding up to the wafer transfer unit 4.

Meanwhile, the cleaning unit 3 is formed mainly by a transfer part 3A and a cleaning part 3B. The transfer part 3A is provided, on its ceiling part, with a filter fan unit (FFU) 24b that supplies the transfer part 3A with clean air as a result of removing particles therefrom. Note that, if only providing an ionizer (not shown) on the lower part of the FFU 24b, it becomes possible to remove electric charges from the wafers W.

In the transfer part 3A, there are a rotor rotation mechanism 31, a posture changing mechanism 32 for controlling a posture of the rotor rotation mechanism 31, a vertical driving mechanism 33 for moving the rotor rotation mechanism 31 and the posture changing mechanism 32 to a vertical direction, a horizontal driving mechanism 34 for moving the vertical driving mechanism 33 to a horizontal direction, a cover 35a for preventing particles flying toward the rotor rotation mechanism 31, which originate in the posture changing mechanism 32 and the vertical driving mechanism 33, from adhering to the wafers W, and a cover 35*b* for preventing particles flying toward the rotor rotation mechanism 31, which originate in the vertical driving mechanism 33, from adhering to the wafers W.

The rotor rotation mechanism 31 comprises a rotor 36 allowing the wafers W to be held at predetermined intervals, a servo motor 30 as the rotation driving apparatus of the present invention, which rotates the rotor 36 so as to allow in-plane rotation of the wafers W held by the rotor 36, a joint part 37 in connection with the posture changing mechanism 32, a lid body 40 that closes a rotor loading-and-unloading port 39 formed in an outer chamber 38*a* when inserting the rotor 36 into the outer chamber 38*a* mentioned later, and a rotating shaft 41 (see FIG. 5 and FIG. 7) penetrating the joint part 37 and the lid body 40 to connect the rotor 36 with the servo motor 30.

As shown in FIG. 5, the rotor 36 includes a pair of discs 42*a*, 42*b* arranged so as to leave a certain space therebetween, holding members 43*a* having grooves etc. formed to hold the wafers W, openable and closable holders 43*b* having grooves etc. similar to those of the holding members 43*a* and lock pins 43*c* for controlling whether the holders 43*b* can open and close or not.

Figure 3:
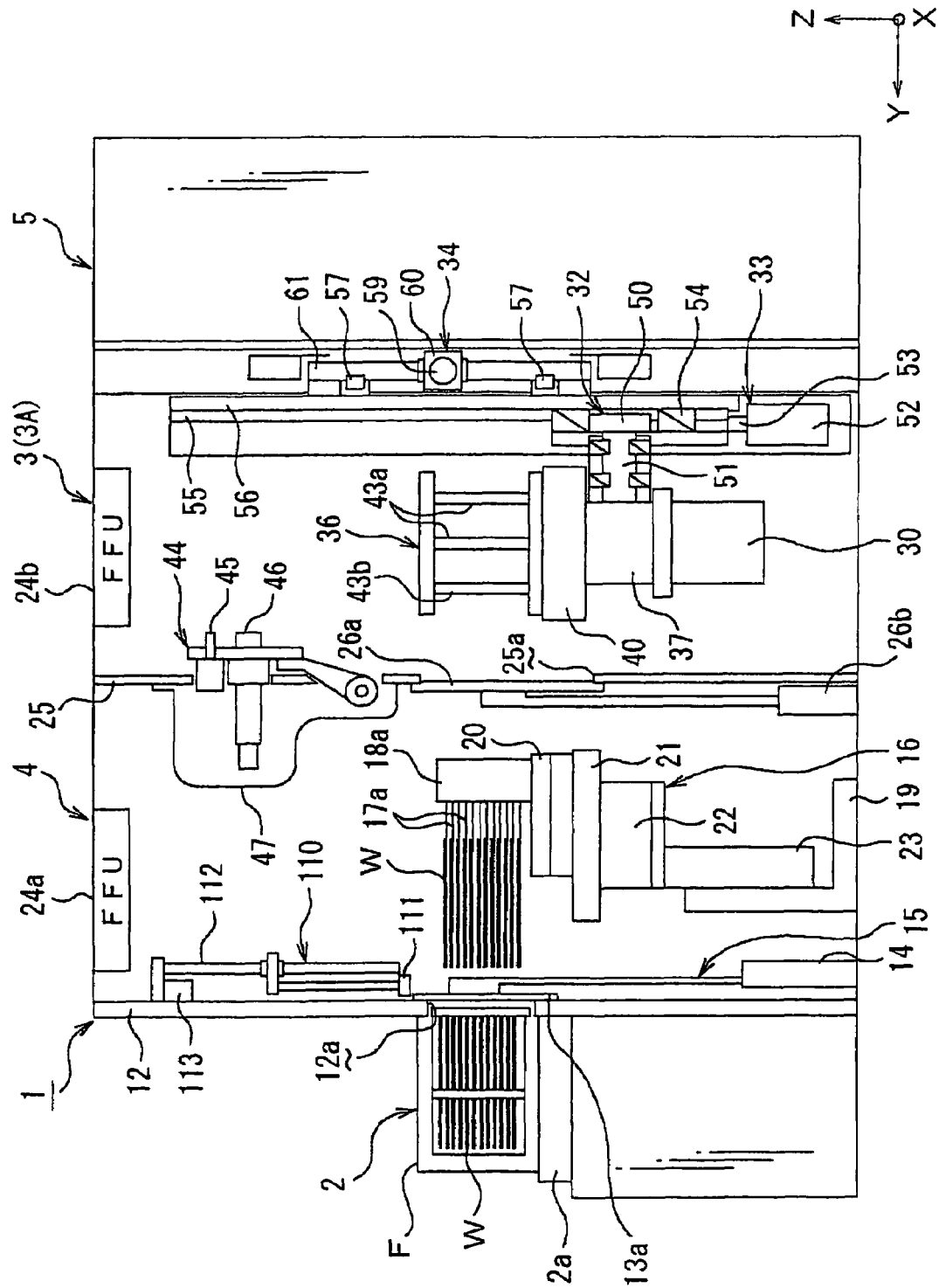
FIG. 3 is a side view of the cleaning system shown in FIG. 1.
Figure 4:
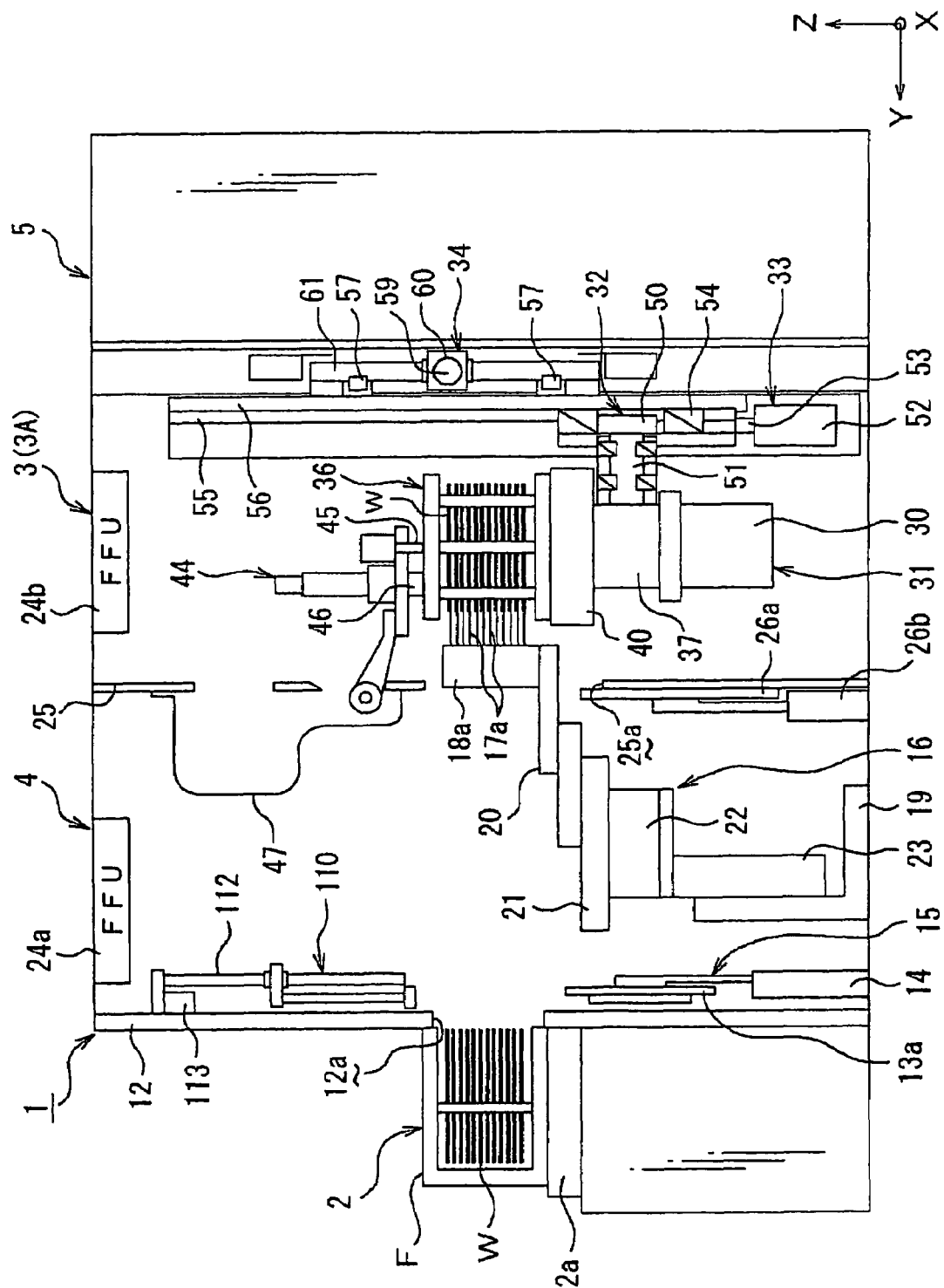
FIG. 4 is another side view of the cleaning system shown in FIG. 1.

As shown in FIGS. 3 and 4, a holder opening-and-closing mechanism 44 that performs opening and closing operations of the holders 43*b* includes a lock-pin pusher cylinder 45 arranged in the partition wall 25, and a holder opening-and-closing cylinder 46. Note that, the partition wall 25 is provided, at its part having the holder opening-and-closing mechanism 44, with a cover 47. Therefore, the wafer transfer unit 4 is insulated from the cleaning unit 3.

In this case, the disc 42*b* is fixed to the rotating shaft 41 by fixing means, for example, screws 48. While, by fixing the holding members 43*a* to the discs 42*a*, 42*b* from their outside through fixing means, such as screws, the holding members 43*a* are built between the discs 42*a*, 42*b*. In a normal state, for example, the lock pins 43*c* occupy their outwardly-protruding positions disenabling the opening-and-closing actions of the holders 43*b*. On the other hand, when the lock pins 43*a* are pushed against the interior of the rotor by pressure of the lock-pin pusher cylinder 45 of the holder opening-and-closing mechanism 44 accessing the rotor 36, the holders 43*b* are brought into openable-and-closable conditions due to the holder opening-and-closing cylinder 46.

In condition that the holders 43*b* are opened, the wafers W can be transferred between the rotor 36 and the transfer tweezers 17*a*, 17*b*. While, on condition that the holders 43*b* are closed, the wafers W in the rotor 36 are maintained in a condition that the wafers W do not protrude out of the rotor 36.

At the position allowing the wafers W to be transferred between the rotor 36 and the transfer tweezers 17*a*, 17*b*, the holder opening-and-closing mechanism 44 is rotatable between its withdrawal position shown in FIG. 3 and the operative position shown in FIG. 4 so that the lock-pin pusher cylinder 45 and the holder opening-and-closing cylinder 46 can access the lock pins 43*c* and the holders 43*b*, respectively. In order to accomplish the above-mentioned opening-and-closing actions of the holders 43*b*, the lock-pin pusher cylinder 45 is equipped with a pusher mechanism that, at its processing position, allows the lock pins 43*c* to be pushed into the rotor 36. While, the holder opening-and-closing cylinder 46 is operatively constructed so as to access the holders 43*b* outside the disc 42*a* for opening or closing the holders 43*b*.

In order to open or close the holders 43*b* in accordance with the operating forms of the holders 43*b*, the lock pins 43*c* and the holder opening-and-closing mechanism 44, for example, it is firstly performed to make the holder opening-and-closing mechanism 44 at the withdrawal position move to the operative position, in other words, against the rotor 36 and further performed to maintain a condition where the lock pins 43*c* are pushed into the rotor 36 by the lock-pin pusher cylinder 45. In this state, the holder opening-and-closing cylinder 46 is operated to open the holders 43*b*. Consequently, it becomes possible to load and unload the wafers W.

After completing the loading-and-unloading operation of the wafers W, it is carried out to close the holders 43*b* and subsequently, pressure of the lock-pin pusher cylinder 45 is released to cover the condition where the lock pins 43*c* project from the disc 42*a*, in other words, the holders 43*b* are locked. Further, the holder opening-and-closing mechanism 44 is returned to the withdrawal position.

Figure 6A:
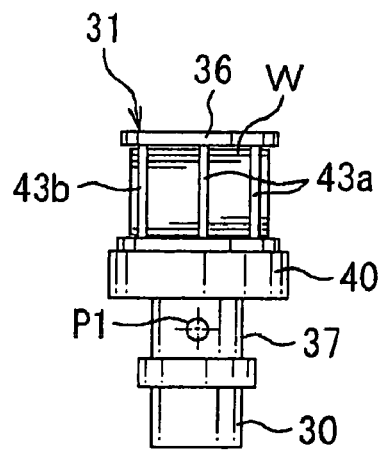
FIGS. 6A, 6B, 6C and 6D are explanatory views showing moving conditions of the rotor.
Figure 6B:
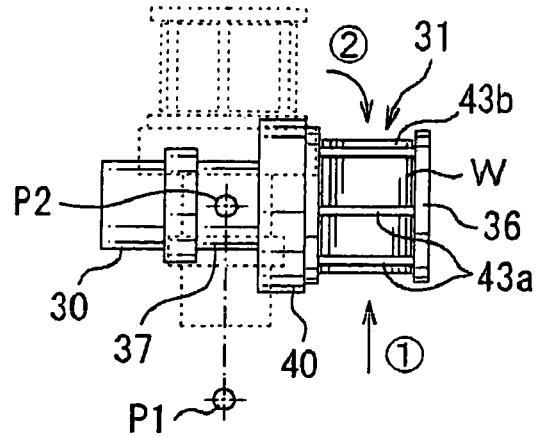
Figure 6C:
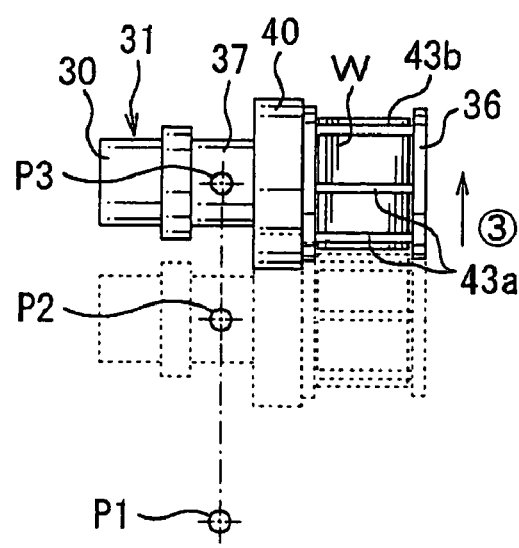
Figure 6D:
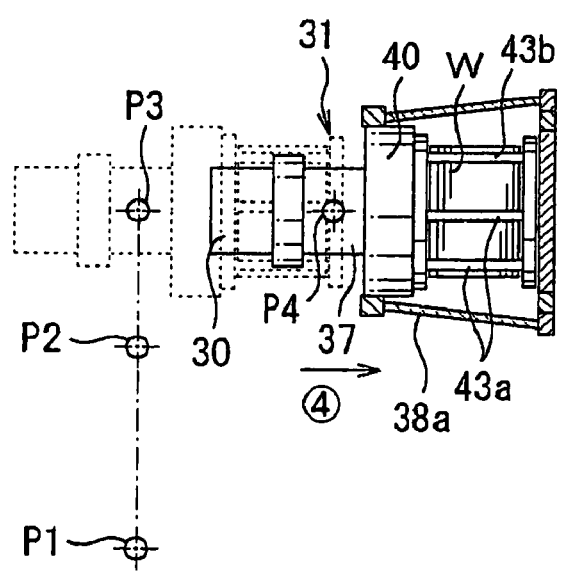

A posture changing mechanism 32 for controlling the posture of the rotor rotation mechanism 31 includes a rotating shaft 51 fixed to the joint part 37 of the rotor rotation mechanism 31 and a rotating mechanism 50 for rotating the rotating shaft 51 in a vertical direction. In this case, the rotating shaft 50 is equipped with e.g. a servo motor. Owing to the rotating mechanism 50, it is possible to maintain the whole rotor rotation mechanism 31 in a posture (vertical posture) where the wafers W are held in the horizontal state, as shown FIG. 3 or FIG. 4. Additionally, as shown in FIGS. 6B, 6C and 6D, the rotation mechanism allows the above posture to be changed to a posture (horizontal posture) where the wafers W are held in the vertical state.

The vertical driving mechanism 33 is formed by a ball screw mechanism that consists of e.g. a counter-rotatable motor 52 formed by a servo motor, a vertical screw shaft 53 rotated by the motor 52 and extending in the vertical direction and a vertical moving block 54 fixed to the rotating mechanism 50 of the posture changing mechanism 32 and further screwed with the vertical screw shaft 53 through a number of balls (not shown). In this case, the vertical moving block 54 is slidably fitted to a vertical guide 55 arranged in parallel with the vertical screw shaft 53. Note, the vertical guide 55 is supported by a supporting body 56.

In the vertical driving mechanism 33 constructed in this way, when the motor 52 is rotated, the vertical screw shaft 53 rotates. Then, with the rotation of the vertical screw shaft 53, the posture changing mechanism 32 and the rotor rotation mechanism 31 can move in the vertical direction (Z-direction) along the vertical guide 55 by a predetermined distance, together with the vertical block 54.

The horizontal driving mechanism 34 includes a pair of horizontal guides 57 extending in the horizontal direction, a counter-rotatable motor (not shown) formed by e.g. a servo motor, a horizontal screw shaft 59 connected to the motor, a horizontal moving block 60 screwed with the horizontal screw shaft 59 through a number of balls (not shown) and a connecting member 61 slidably fitted to the horizontal guides 57 and connecting the horizontal moving block 60 with the supporting body 56.

In the horizontal driving mechanism 34 constructed in this way, when the motor is rotated, the horizontal screw shaft 53 rotates, so that the horizontal moving block 60 moves in the horizontal direction (X-direction) with the rotation of the horizontal screw shaft 59. Then, the connecting member 61 and the supporting body 56 also move in the X-direction together with the horizontal moving block 60 since the connecting member 61 connects the horizontal moving block 60 with the supporting body 56. That is, when the horizontal moving block 60 moves in the X-direction, all of the rotor rotation mechanism 31, the posture changing mechanism 32 and the vertical driving mechanism 33 move in the X-direction, simultaneously.

FIGS. 6A to 6D are explanatory views showing an example of mode of moving the rotor rotation mechanism 31 by use of the posture changing mechanism 32, the vertical driving mechanism 33 and the horizontal driving mechanism 34. FIGS. 6A to 6D illustrate respective conditions (postures) of the rotor rotation mechanism 31 when the joint part 37 of the rotor rotation mechanism 31 are positioned at positions P1 to P4. Here described in order to insert the rotor 36 carrying the wafers W into the chamber 38 is one example of moving the rotor rotation mechanism 31 so that the joint part 37 moves from the position P1 to the position P4.

First of all, when the joint part 37 is at the position P1, the rotor rotation mechanism 31 is arranged in a position allowing the wafers W to be transferred between the rotor 36 and the wafer transfer mechanism 16. Then, the rotor rotation mechanism 31 is under a condition of vertical posture. Under condition that the wafers W are accommodated in the rotor 36, it is first carried out to operate the vertical driving mechanism 33 and elevate the rotor rotation mechanism 31 and the posture changing mechanism 32 so that the joint part 37 reaches the position P2. At the position P2, by operating the posture changing mechanism 32, the whole rotor rotation mechanism 31 is rotated 90 degrees to allow the wafers W in vertical arrangement to be changed to the horizontal arrangement, establishing the whole rotor rotation mechanism 31 in the horizontal posture.

Next, by operating the vertical driving mechanism 33 again, it is carried out to elevate the whole rotor rotation mechanism 31 in the horizontal posture so that the joint part 37 reaches the position P3. In this way, by executing posture-changing of the rotor rotation mechanism 31 at the position P2 that is a midpoint in the course of elevating the rotor rotation mechanism 31, it is possible to ensure that the rotor rotation mechanism 31 rotates in a narrow space, in comparison with situation of rotating the rotor rotation mechanism 31 with the joint part 37 at the position P1 or P3. Consequently, it becomes possible to reduce a space occupied by the transfer part 3A.

After the joint part 37 has reached the position P3, the horizontal driving mechanism 34 is operated to move the joint part 37 up to the position P4 horizontally. When the joint part 37 occupies the position P4, the rotor 36 can be inserted into the chamber 38, allowing a performance of the cleaning operation. In this way, it enables the rotor 36 to be moved from the a delivery position with the wafer transfer mechanism 16 to the cleaning part. Then, at the cleaning part, the cleaning operation to supply the wafers W with a cleaning liquid, such as chemical liquid, is carried out while rotating the rotor 36 by driving the servo motor 30. In this case, the servo motor 30 is controlled so as to be rotatable at a predetermined high-speed revolution, e.g. 100 to 3000 rpm or at a predetermined low-speed revolution, e.g. 1 to 500 rpm, selectively and repeatedly, based on a program memorized in control means, for example, a host controller 70. Note that, in this case, although the number of low-speed revolution overlaps with the number of high-speed revolution in part, either the low-speed revolution or the high-speed revolution is established corresponding to the viscosity of a chemical liquid. In case of a uniform chemical liquid, the number of low-speed revolution does not overlap with the number of high-speed revolution (same applies to the following descriptions). The term "low-speed revolution" here means a low speed in comparison with the number of revolutions to make a centrifugal force throw off a chemical liquid in contact with the wafers W. While, the term "high-speed revolution" here means a high speed in comparison with the number of revolutions to enable a supplied chemical liquid to be in contact with the wafers W and sufficiently reactive with the wafers W.

As mentioned above, the servo motor 30 carries out the predetermined high-speed revolution (e.g. 100 to 3000 rpm) and the predetermined low-speed revolution (e.g. 1 to 500 rpm) selectively and repeatedly, based on the preset program. However, if a supply voltage on the servo motor 30 comes down during the operation (especially, accelerating revolution or high-speed revolution) and the revolution is stopped consequently, there arises a possibility that the wafers W are damaged due to vibrations etc. and a driving time and furthermore, a processing period is increased.

Therefore, according to the servo motor 30 of the present invention, its rotation is controlled in correspondence with such a voltage drop during the driving operation in order to suppress damage on the wafers W and further suppress increasing of the driving (processing) period.

Figure 8:
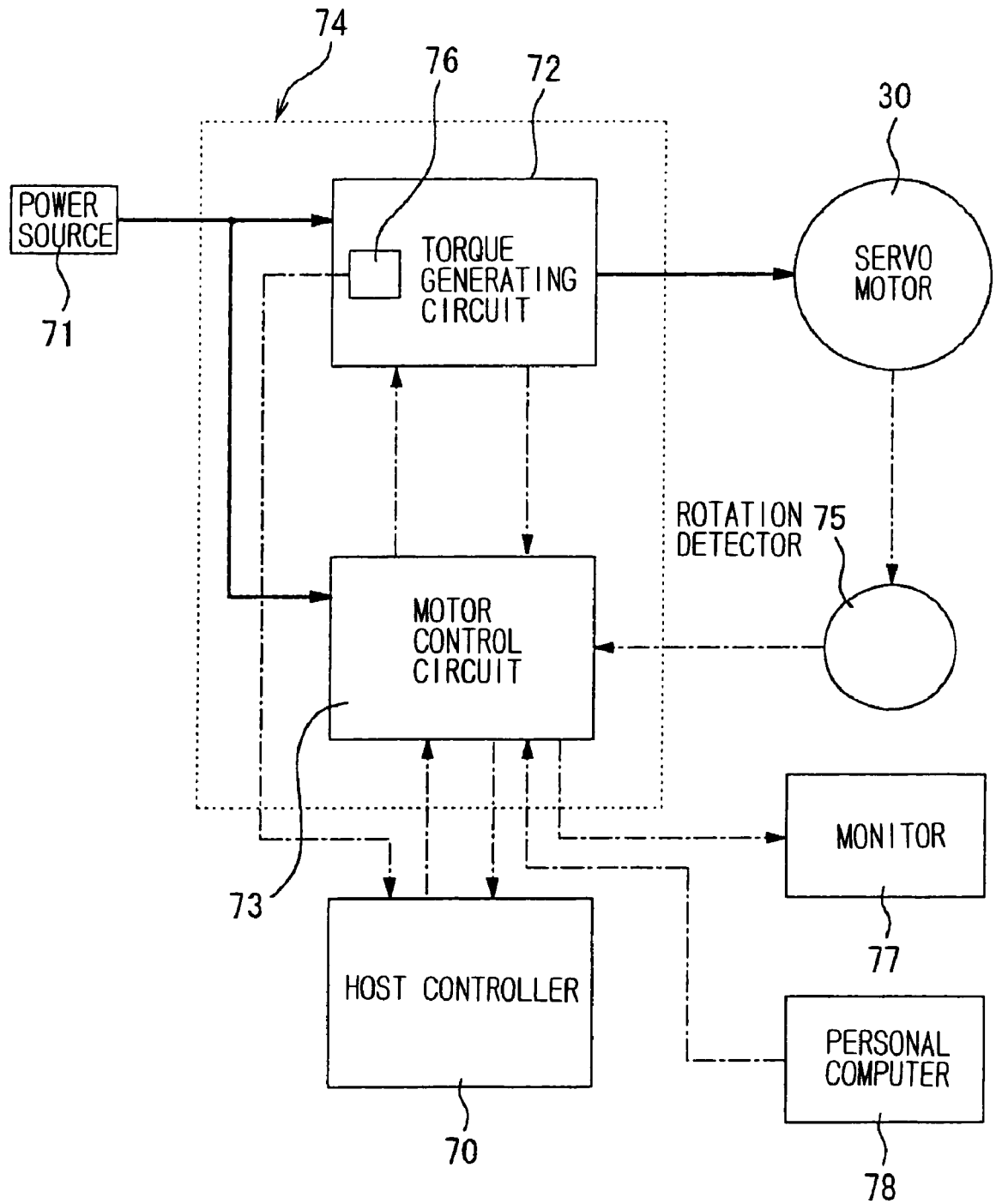
FIG. 8 is a block diagram showing a control part of the servo motor driving the rotor.

The structure of the servo motor 30 will be described in detail, with reference to FIGS. 8 to 10. FIG. 8 is a block diagram showing a driving part of the servo motor 30.

The driving part of the above servo motor 30 is formed mainly by a servo amplifier 74 consisting of a torque generating circuit 72 for generating a torque of the servo motor 30 by a voltage supplied from a power source 71 and a motor control circuit 73 for controlling the revolution of the servo motor 30, a rotation detector 75 as rotation detecting means that detects the revolution speed of the servo motor 30 and further transmits a detection signal on detection to the motor control circuit 73, and the host controller 70 as control means that outputs and inputs (delivers) the revolution speed of the motor and the number of revolutions to and from the motor control circuit 73. Note that, a monitor 77 and a personal computer 78 can be connected with the motor control circuit 73 of the servo amplifier 74.

In this case, the servo amplifier 74 is provided, in the torque generating circuit 72, with a condenser 76 as voltage detecting means that detects a level of the supply voltage and a period of voltage drop. Such a voltage-drop information (i.e. electric charge accumulated in the condenser 76) detected by the servo amplifier 74 is transmitted (input) to the host controller 70.

Meanwhile, the host controller 70 is previously constructed so as to memorize a power-recovery information about a voltage drop and its period under an instantaneous blackout recoverable within a predetermined period (e.g. 0.05 sec. to 1 sec.) and a rotation-control pattern information of the motor corresponding to the power-recovery information. Further comparing the voltage-drop information with the power-recovery information with the rotation-control pattern information of the motor, the host controller 70 is formed so as to enable the revolution of the servo motor 30 to be controlled, based on control signals as a result of the comparison.

Figure 12:
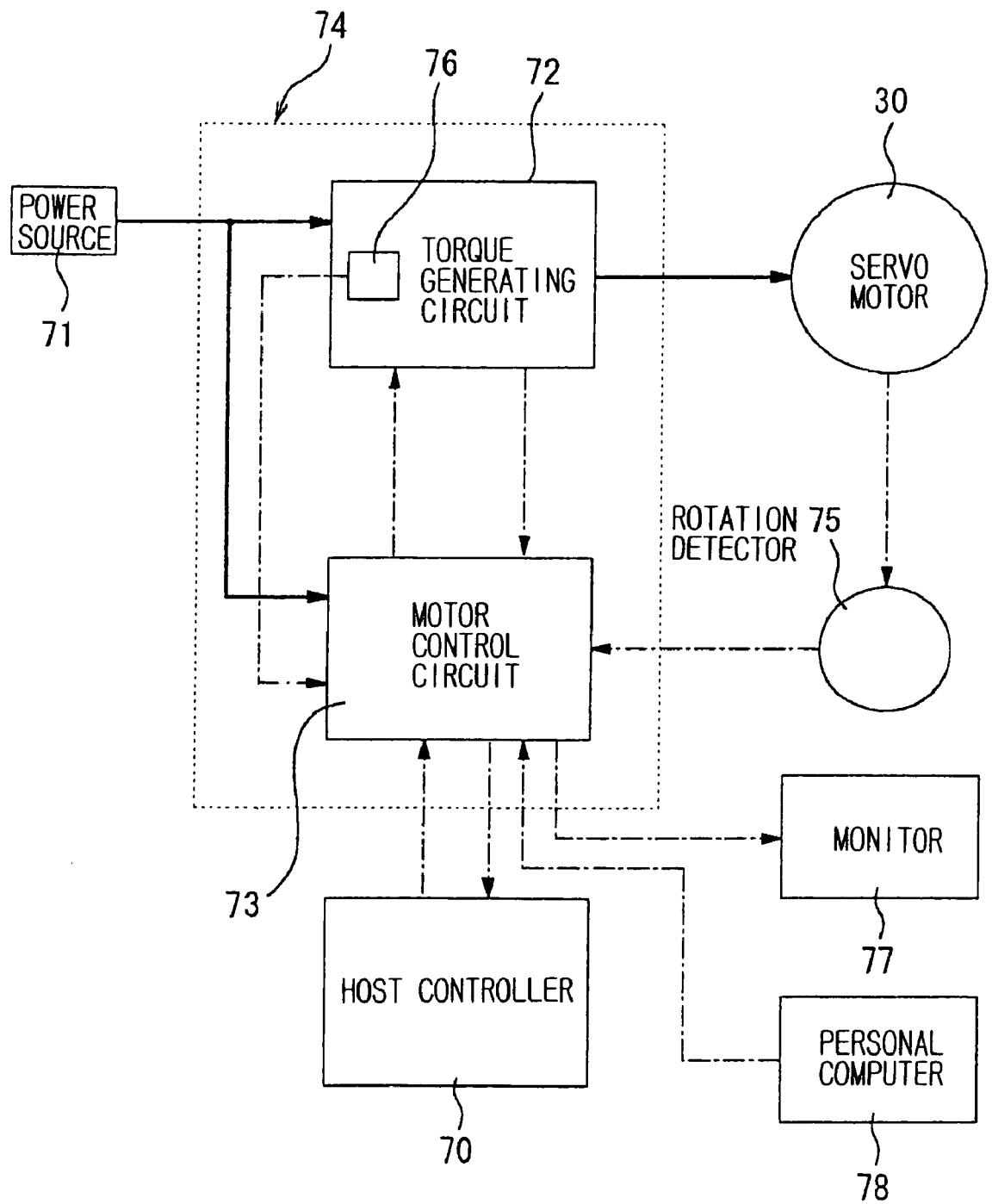
FIG. 12 is a block diagram showing another example of the control part of the servo motor driving the rotor.

Alternatively, the similar processing could be attained by the following steps of: making the host controller 70 memorize the rotation-control pattern information of the motor only; transferring the rotation-control pattern information to the motor control circuit 73 in advance; also making the motor control circuit 73 memorize the power-recovery information only; and as shown in FIG. 12, transmitting the voltage-drop information detected by the condenser 76 to the motor control circuit 73.

Figure 9:
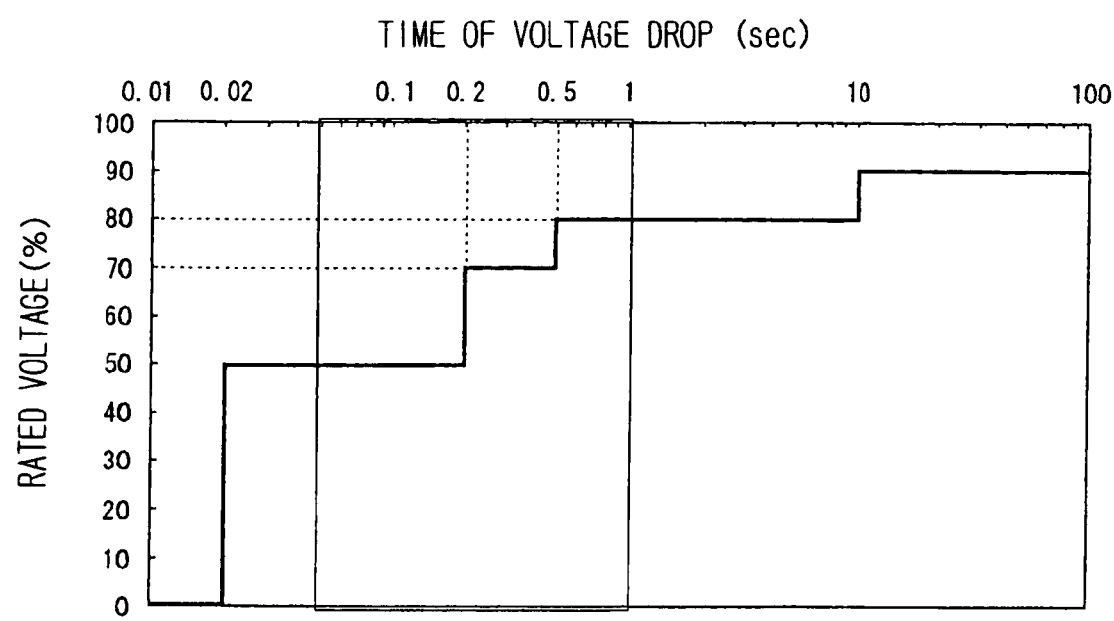
FIG. 9 is a graph showing a relationship between rated voltage and voltage-drop time in of the servo motor.

The "power-recovery information" here, which is standardized by SEMI (Semiconductor Equipment and Materials International), is effected by converting the following contents into signals: even when the voltage is lowered to 50% in the ratio of voltage to a rated voltage at an instantaneous blackout within a prescribed range of FIG. 9 and if only such a voltage drop is in the range of 0.2 sec., then the drive of the motor can be maintained; and even when the voltage is lowered to 70% in the above situation and if only such a voltage drop is in the range of 0.5 sec., then the drive of the motor can be maintained. Incidentally, though it is out of the prescribed range, even when the voltage is lowered to 80%, the voltage drop in the range of 10 sec. allows the motor to be driven continuously. Note, the power-recovery information is not always included within the above prescribed range and may be established so as to also include a situation that the voltage is lowered to 80%.

Figure 10A:
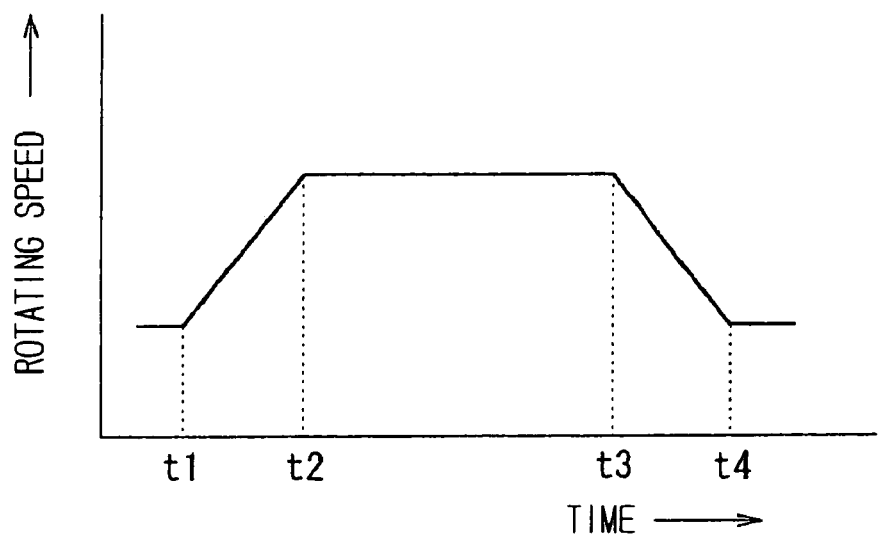
Figure 10B:
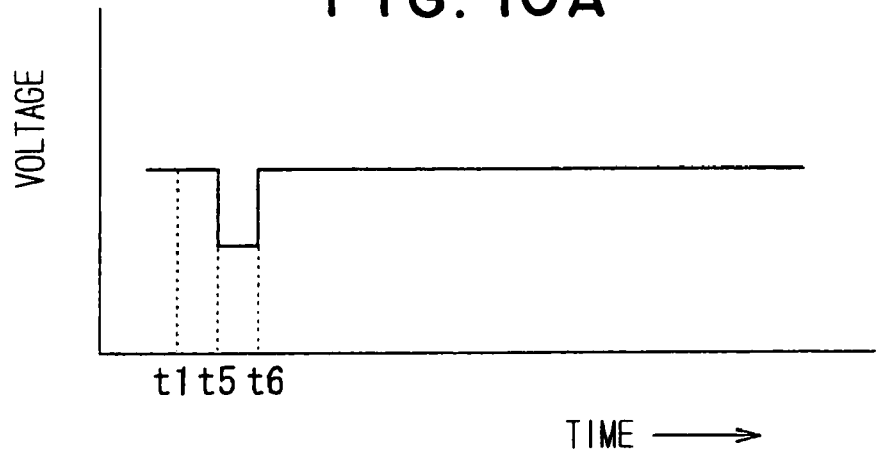
Figure 10C:
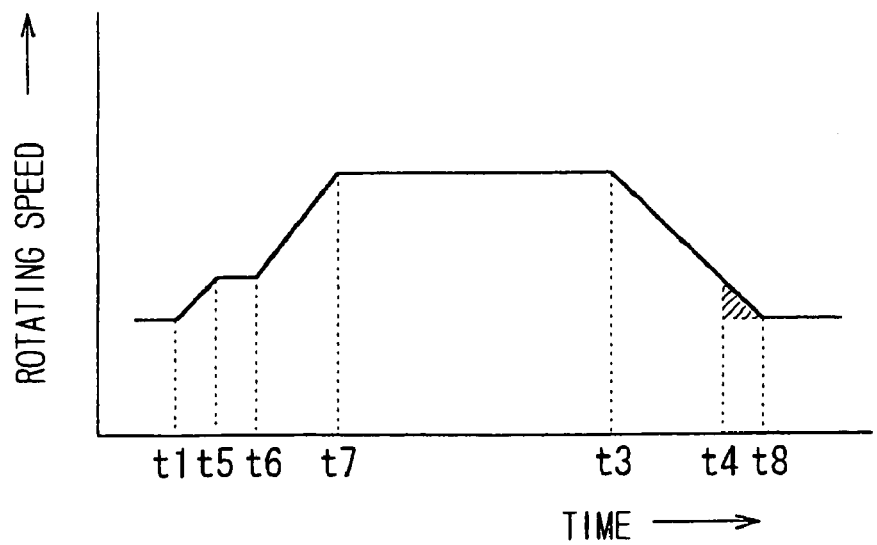

Further, we describe one example of the rotation control pattern information. As shown in FIG. 10A, for example, in a normal operation pattern where the servo motor 30 is first accelerated from time t1 to time t2, secondary rotated at a constant high speed from time t2 to time t3 and thereafter decelerated from time t2 to time t4, namely, in the normal operation pattern to perform an accelerating rotation, a constant high-speed rotation and a decelerating rotation in succession, if a voltage drop is generated (t5→t6) during the accelerating rotation of the servo motor 30 (t1→t2), that is, if the condenser 76 detects a voltage drop, there is one rotation control pattern information based on control signals from the host controller 70. Thus, the information has the steps of: decelerating the servo motor 30 from time t5 to time t6; subsequently rotating the motor at a constant speed; after the power recovery, performing the remaining accelerating rotation (t6→t7), a constant high-speed rotation (t7→t3) and a decelerating rotation (t3→t4) and thereafter, compensating the acceleration at the voltage drop {rotation in deceleration (t4→t8). Additionally, if a voltage drop is detected during the accelerating rotation of the servos motor 30 as similar to the above case, there is supposed, as another control pattern information, a rotation-control pattern information based on the control signals from the host controller 70. This information has the steps of: decelerating the servo motor 30; rotating it at a constant speed; and stopping the rotation of the servo motor 30 after time has passed an instantaneous blackout period (e.g. passage of 0.2 sec. in case of a voltage drop of 50%, passage of 0.5 sec. in case of a voltage drop of 70%).

Such a control pattern information is previously memorized in the host controller 70 by appropriately altering a time constant of the servo motor 30 in accordance with the driving pattern under the conditions of voltage drop, at the stage of initial set-up. It is further carried out to compare the rotation-control pattern with the above power-recovery information inputted in the host controller 70 and further transmit its control signal to the servo motor 30. When the supply voltage from the power source 71 drops during driving (operating) of the servo motor 30, it is carried out to once decelerate its rotation by the time constant established at the initial set-up without stopping the rotation of the servo motor 30. Then, if this voltage drop comes from an instantaneous blackout which is recoverable, the rotation of the servo motor 30 after the deceleration is controlled to a constant speed. After the power recovery, it is carried out to compensate the accelerating rotation at the voltage drop. Otherwise, if the voltage drop has passed an instantaneous blackout period, the rotation of the servo motor 30 is stopped.

Alternatively, the similar processing could be attained by storing the rotation-control pattern into the host controller 70 and further storing the power-recovery information into the motor control circuit 73.

Figure 11A:
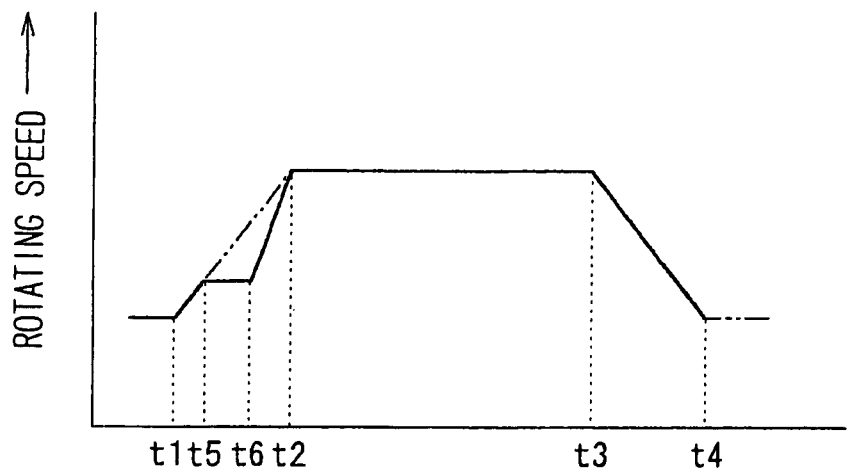
FIGS. 11A, 11B and 11C are graphs respectively showing relationships between rotating speed and time in the other rotation control patterns of the servo motor.
Figure 11B:
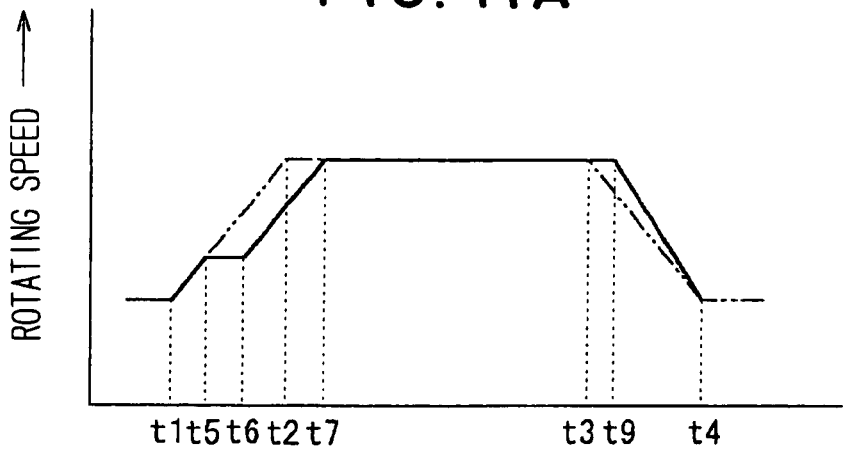
Figure 11C:
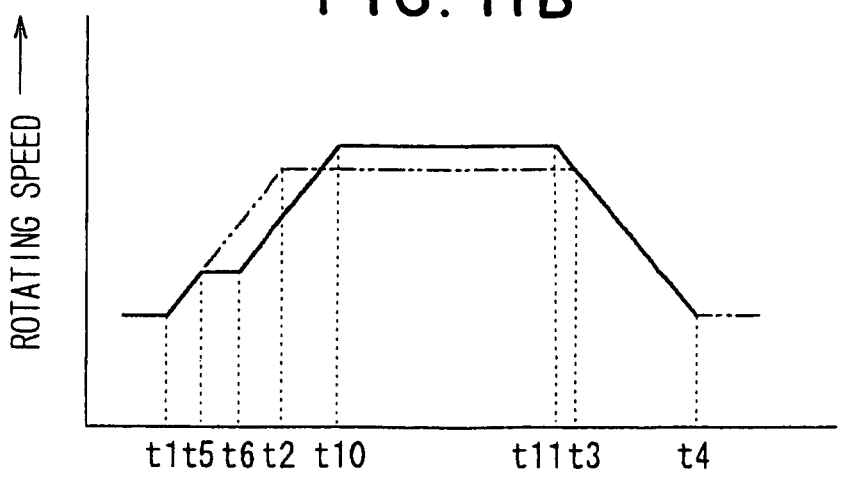

Although the accelerating rotation at the voltage drop is compensated after changing the rotation of the servo motor from a high speed to a low speed after the power recovery in the above description, the compensation may be carried out by proceeding the acceleration of the servo motor 30 after the power recovery. As for the control pattern to accelerate the servo motor 30 sequential to the power recovery, there are three patterns as follows. One of the patterns is that, as shown in FIG. 11A, the accelerating rotation sequential to the power recovery of the servo motor 30 is executed by increasing an acceleration rate of the rotation-control pattern toward a finish time (t2) of the accelerating rotation in the normal rotation-control pattern (FIG. 10A) established in advance. The other one is, as shown in FIG. 11B, to make the accelerating rotation of the servo motor 30 sequential to the power recovery coincide with the accelerating rotation of the normal rotation-control pattern (FIG. 10A) established in advance, to make a period {(t9−t7)=(t3−t2)} of the constant high-speed rotation of the servo motor 30 establish equal to the period (t3−t2) of the constant high-speed rotation in the rotation-control pattern and to increase a deceleration rate of the decelerating rotation of the servo motor 30 toward a finish time (t4) of the decelerating rotation of the rotation-control pattern. A further alternative one is, as shown in FIG. 11C, to make the accelerating rotation sequential to the power recovery of the servo motor 30 higher than the constant high-speed rotation in the normal rotation-control pattern (FIG. 10A) established in advance, to rotate the servo motor 30 at the higher speed for a predetermined period (t10→t11) and thereafter, to decelerate the rotation of the servo motor 30 toward the finish time (t4) of the rotation-control pattern.

As mentioned above, by either controlling the acceleration rate of the accelerating rotation of the servo motor 30 after the power recovery or appropriately controlling the number of revolutions, periods, etc. of the constant high-speed rotation or the decelerating rotation, it is possible to realize the control of the servo motor 30 in accordance with the rotation-control pattern established in advance.

The above description is directed to cope with a voltage drop in the course of accelerating the servo motor. Nevertheless, even when a voltage drops during rotating at a high speed, it is possible to control the servo motor 30 by comparing the power-recovery information with the rotation-control pattern information at detecting the voltage drop.

Accordingly, since the supply voltage from the power source 71 never drops during driving (operation) of the servo motor 30 without decelerating it, it is possible to suppress vibration of the wafers in comparison with a measure of stopping the rotation of the servo motor at a voltage drop, whereby damage on the wafers W can be reduced. Further, if the voltage drop comes from an instantaneous blackout, the accelerating rotation etc. at the voltage drop can be compensated after the power recovery and therefore, it is possible to suppress increasing of the driving (operation) period of the servo motor 30, in other words, increasing of the processing time. Consequently, the throughput of the apparatus can be improved.

Next, the cleaning part 3B will be described. As shown in FIG. 2, the cleaning part 3B includes a chamber 38 of double structure consisting of a fixed outer chamber 38a and an inner chamber 38b slidable in the horizontal direction. Again, the cleaning part 3B is provided with a cleaning mechanism 80 for cleaning and drying the inner chamber 38b. Note, the cleaning part 3B includes a slide mechanism 81 for the inner chamber 38b and a slide mechanism 82 for the cleaning mechanism 80.

The outer chamber 38a includes a cylindrical body 83 forming the contour of this outer chamber 38a, ring members 84a, 84b arranged on end faces of the cylindrical body 83, seal mechanisms 85a, 85b arranged on inner circumferential faces of the ring members 84a, 84b, a cleaning-liquid discharging nozzle 87 formed with a number of cleaning-liquid discharging ports 86 in the horizontal direction and also attached to the cylindrical body 83, a nozzle case 88 accommodating the cleaning-liquid discharging nozzle 87 and an exhaust/drain pipe 89a arranged in the lower part of the outer chamber 88a to discharge the cleaning liquid and gas.

The cylindrical body 83 and the ring members 84a, 84b are fixed with each other. The whole outer chamber 38a is retained at designated positions of the bottom part and the ceiling part of the cleaning part 3B while supporting the cylindrical body 83. In this case, the outer chamber 38a is equipped with a position adjusting mechanism (not shown) for fine adjustments of height and horizontal position of the chamber 38a, allowing the rotor rotating mechanism to be smoothly inserted and withdrawn at a designated position.

In the ring member 84a, a rotor loading/unloading port 39c is formed to allow ingression and withdrawal of the rotor 36. As shown in FIG. 2, this rotor loading/unloading port 39c is openable and closable by a lid body 84d. Under condition that the rotor 36 enters the outer chamber 38a, the rotor loading/unloading port 39c is closed up by the lid body 40, while a clearance between the outer circumferential face of the lid body 40 and the rotor loading/unloading port 39c is sealed by a seal mechanism 85a. Consequently, it is possible to prevent the cleaning liquid in the chamber 38 from scattering to the transfer part 3A.

Further, in an outside lower part pf the ring member 84a, a liquid receptor 84e is provided to prevent the cleaning liquid etc. adhering to the lid body 40 and the seal mechanism 84 etc. from leaking out through the rotor loading/unloading port 39c when discharging the rotor rotation mechanism 31. Consequently, by preventing the cleaning liquid from polluting a floor of the cleaning part 3B, the cleaning part 3B can be maintained cleanly.

Figure 7:
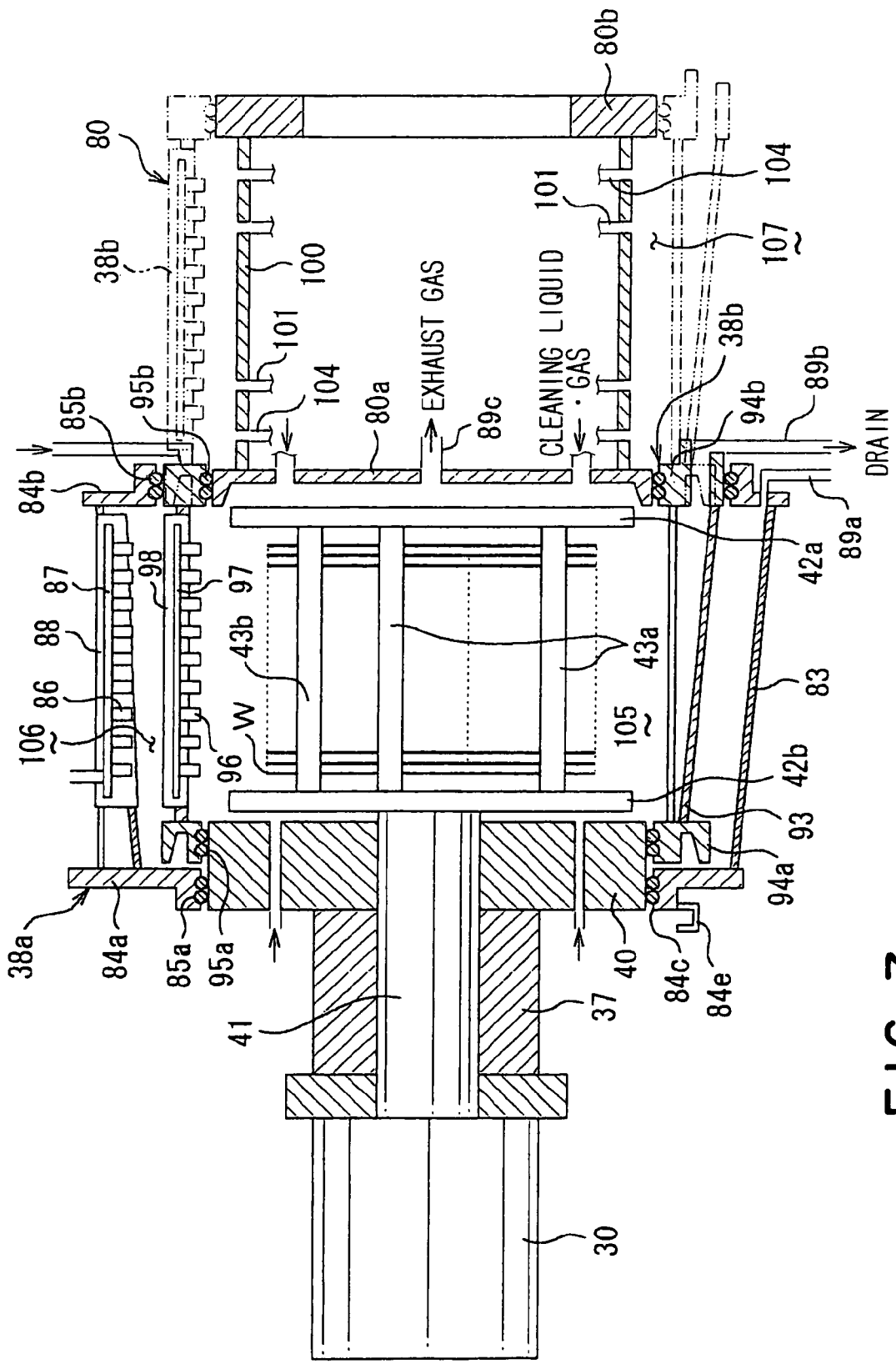
FIG. 7 is a sectional view of a use condition of the rotor.

With supply of various kinds of chemical liquids, deionized water, IPA, etc. from a cleaning-liquid source, such as the chemical storage unit 5, and dry gas, such as nitrogen (N2) gas, the above cleaning-liquid discharging nozzle 87 is constructed so as to allow these cleaning liquids to be ejected from the cleaning-liquid discharging ports 86 to the wafers W retained in the rotor 36. In this embodiment, the single cleaning-liquid discharging nozzle 87 is shown in FIG. 7. However, a plurality of nozzles may be arrange instead of the single nozzle. It is not necessarily required to arrange the nozzle just above the cylindrical body 83.

In the cylindrical body 83, its outer diameter on the side of the ring member 84b close to the cleaning mechanism 80 becomes larger than the outer diameter on the side of the ring member 84a, providing a substantial-cone shaped configuration. Therefore, the various cleaning liquids ejected from the cleaning-liquid discharging nozzle 87 against the wafers W are easy to flow, on the bottom face of the cylindrical body 83, from one side close to the ring member 84a to the other side close to the ring member 84b and finally, the exhaust/drain pipe 89a, naturally.

Meanwhile, the inner chamber 38b includes a cylindrical body 93, ring members 94a, 94b arranged on both ends of the cylindrical body 93, seal mechanisms 95a, 95b each arranged at two positions on each inner circumferential face of the ring members 94a, 94b, a cleaning-liquid discharging nozzle 97 formed with a number of cleaning-liquid discharging ports 96 in the horizontal direction and also attached to the cylindrical body 93, a nozzle case 98 accommodating the cleaning-liquid discharging nozzle 97 and an exhaust/drain pipe 89b arranged in the lower part of the inner chamber 88b to discharge the cleaning liquid and gas.

Different from the cylindrical body 83 of the outer chamber 38a, the above cylindrical body 93 is shaped to have a cylindrical configuration that its body part close to the ring member 94a has the same diameter as that of the body part close to the ring member 94b and is arranged horizontally. Therefore, in order to facilitate discharging of the cleaning liquid, the cylindrical body 93 is provided, in its lower part, with a groove part 92 projecting from the cylindrical body 93 with a predetermined gradient and extending in the longitudinal direction. For instance, when the inner chamber 38b is in the processing position, the cleaning liquid ejected from the cleaning-liquid discharging nozzle 97 against the wafers W flows in the groove part 92 and is discharged from the drain through the exhaust/drain pipe 89b.

With supply of a designated chemical liquid from a chemical liquid source, such as the chemical storage unit 5, the above cleaning-liquid discharging nozzle 97 is constructed so as to allow the chemical liquid to be ejected from the cleaning-liquid discharging ports 96 to the wafers W retained in the rotor 36. In this embodiment, the single cleaning-liquid discharging nozzle 97 is shown in FIG. 7. However, a plurality of nozzles may be arrange instead of the single nozzle. It is not necessarily required to arrange the nozzle just above the cylindrical body 93.

The cleaning mechanism 80 includes a cylindrical body 100, a disc 80a attached to one end face of the cylindrical body 100, a disc 80b attached to the other end face of the cylindrical body 100, gas discharging nozzles 100 and an exhaust pipe 102 both attached to the cylindrical body 100. The disc 80b is provided with deionized-water discharging nozzles 103 and exhaust pipes 104.

When the inner chamber 38b is in the processing position, as shown in FIG. 7, a clearance between the ring member 94a and the lid body 40 is sealed by the seal mechanism 85b, while a clearance between the ring member 94b and the disc 80a of the cleaning mechanism 80 is sealed by the seal mechanism 95b. In this way, when the inner chamber 38b is in the processing position, a processing chamber 105 is defined by the cylindrical body 93, the ring members 94a, 94b, the disc 80a of the cleaning mechanism 80 and the lid body 40.

On the other hand, when the inner chamber 38b is in the withdrawal position, a clearance between the ring member 94a of the inner chamber 38b and the ring member 84b of the outer chamber 38a is sealed by the seal mechanism 85b, while a clearance between the ring member 94b and the disc 80a is sealed by the seal mechanism 95a. Further, when the rotor 36 is inserted into the outer chamber 38a, a clearance between the lid body 40 and the ring member 84a is sealed by the seal mechanism 85a. Therefore, when the inner chamber 38b is in the withdrawal position, as shown with double-dot chain lines of FIG. 7, a processing chamber 106 is defined by the cylindrical body 83, the ring members 84a, 84b, the disc 80a of the cleaning mechanism 80, the ring member 94a of the inner chamber 38b and the lid body 40 of the rotor rotation mechanism 31.

On condition that the inner chamber 38b is in the withdrawal position, the processing chamber 106 is defined in the processing position, as mentioned above. Further, a clearance between the ring member 94a and the disc 80a is sealed by the seal mechanism 95a, while a clearance between the ring member 84b of the outer chamber 38a and the ring member 94a of the inner chamber 38b is sealed by the seal mechanism 85b, so that a narrow cleaning chamber 107 in the form of a substantial cylinder is defined between the outer circumference of the cylindrical body 100 of the cleaning mechanism 80 and the inner circumference of the cylindrical body 93. The gas discharging nozzles 101 at several points of the cylindrical body 100 are capable of ejecting dry gas, such as N2-gas or air, into the cleaning chamber 107. The dry gas discharged from the gas discharging nozzles 101 is exhausted through the exhaust pipes 104.

In the cleaning part 3B constructed above, by moving the inner chamber 38 to the processing position, supplying the wafers W in the processing chamber 105 with a designated chemical liquid in the cleaning operation and subsequently moving the inner chamber 38b to the withdrawal position, it becomes possible to perform the cleaning operation, for example, cleaning operation using deionized water in the processing chamber 106 defined by the outer chamber 38a continuously.

After completing to wash the wafers W with water, the drying operation is carried out continuously. It is noted that after the drying operation, the interior of the outer chamber 38a is also cleaned up and dried. Therefore, in the cleaning process for the wafers W in the next batch, it is possible to start the water-washing operation using the outer chamber 38a immediately after the chemical processing using the inner chamber 38b.

The inner chamber 38b slid to the withdrawal position after the chemical processing is subjected to self-cleaning operation to eject the deionized water into the cleaning chamber 107 through the cleaning-liquid discharging nozzles 97. Then, the interiors of the cleaning-liquid discharging nozzles 97 are cleaned up simultaneously. In this way, after the deionized water ejected into the cleaning chamber 107 is drained from the exhaust/drain pipe 89b, it is possible to perform the drying process in the cleaning-liquid discharging nozzles 97 by ejecting the dry gas, such as N2-gas or air, from the gas discharging nozzles 101 into the cleaning chamber 107. That is, since the interior of the inner chamber 38b is cleaned up, it is possible to allow the inner chamber 38b to get ready for the chemical processing of the next-coming wafers W.

Next, the cleaning process of the wafers W will be described. First of all, it is carried out to mount the foups F (F1, F2) each having twenty-five wafers W accommodated at predetermined intervals, on the foup stages 2a, 2b so that respective wafer loading/unloading ports for transferring the wafers W oppose the window parts 12a, 12b, respectively.

Next, in order to unload the wafers W in the foup F1, the window part 12a is opened to communicate the interior of the foup F1 with the inside of the wafer transfer unit 4. Subsequently, the wafer detecting mechanism 110 inspects the number of wafers W in the foup F1 and their accommodated condition. Here, if abnormality is detected in the accommodated condition of the wafers W, the processing about the wafers W in the foup F1 is discontinued and instead, for example, it is carried to unload the wafers W from the foup F2.

On the contrary, when no abnormality is detected in the accommodated condition of the wafers W in the foup F1, the wafer transfer mechanism 16 is operated to deliver all the wafers W in the foup F1 to the transfer tweezers 17a. In succession, it is carried out to operate the linear driving mechanism 19 and the rotation mechanism 22, thereby establishing a condition allowing the transfer tweezers 17a to approach the rotor 36. In this state, it is carried out to adjust the level of the transfer tweezers 17a by the elevating mechanism 23 and open the window part 25a. Further, opening the holder 43b by the holder opening-and-closing mechanism 44, it is performed to insert the transfer tweezers 17a having the wafers W into the rotor 36. When drawing back the transfer tweezers 17a after closing the holder 43b, the wafers W are delivered to the rotor 36.

After withdrawing the holder opening-and-closing mechanism 44, the rotor 36 is inserted into the outer chamber 38. Additionally, by driving the posture changing mechanism 32, the vertical driving mechanism 33 and the horizontal driving mechanism 34 respectively, the rotor rotating mechanism 27 is moved so that the lid body 40 opposes the rotor loading/unloading port 39c. Then, it is carried out to allow the seal mechanism 85a to seal up a clearance between the ring member 84a of the outer chamber 38a and the lid body 40 and further, the inner chamber 38b is moved to the processing position to form the processing chamber 105. Next, the servo motor 30 is driven to rotate the rotor 36, while the cleaning liquid, such as chemical liquid, is supplied to the wafers W in the cleaning process. At this time, as mentioned above, the servo motor 30 carries out the designated high-speed rotation (e.g. 100 to 3000 rpm) and the designated low-speed rotation (e.g. 1 to 500 rpm) selectively and repeatedly, in accordance with the program established in advance. If the supply voltage to the servo motor 30 drops during the above operation (especially, rotating in acceleration or high-speed rotation), the rotation of the servo motor 30 is controlled corresponding to the voltage drop during driving of the rotor, thereby suppressing the damage on the wafers W and the increase in the driving (operation) period.

In detail, upon memorizing the rotation control pattern information in the host controller 70 in advance, it is carried out to compare the above information with the power-recovery information {i.e. information about voltage drop and time under an instantaneous blackout capable of recovering within a predetermined period (e.g. 0.05 to 1 sec.)} inputted in the host controller 70 and further carried out to transmit (output) its control signal to the servo motor 30. When the supply voltage from the power source 71 drops during driving (operating) of the servo motor 30, it is carried out to once decelerate its rotation. Then, if this voltage drop comes from an instantaneous power blackout which is recoverable, the rotation of the servo motor 30 after the deceleration is controlled to a constant speed. After the power recovery, it is carried out to compensate the acceleration at the voltage drop. Otherwise, if the voltage drop has passed an instantaneous blackout time, the rotation of the servo motor 30 is stopped. Note, in place of this control, the servo motor 30 may be controlled in accordance with the above-mentioned control pattern shown in FIGS. 11A to 11C.

Alternatively, the similar operation could be effected by making the host controller 70 store the rotation control pattern information and also making the motor control circuit 70 store the power-recovery information.

Therefore, as the servo motor 30 is decelerated necessarily when the supply voltage from the power source 71 drops during driving (operating) of the servo motor 30, it is possible to suppress vibration in comparison with a measure to stop the rotation of the motor at the voltage drop, whereby the damage on the wafers W can be suppressed. Further, as the rotation in acceleration at the voltage drop can be compensated after the power recovery in case that the voltage drop comes from an instantaneous blackout, it is possible to restrain increasing of the driving (operation) period of the servo motor 30, that is, to suppress increasing of the processing period. Consequently, the throughput can be improved with improved reliability of the apparatus.

After the chemical processing is ended, the inner chamber 38b is moved to the withdrawal position where the preparation for processing the wafers W in the next batch is carried out by cleaning and drying the inner chamber 38b by the cleaning mechanism 80. Meanwhile, as for the wafers W in the processing chamber 106 formed by the outer chamber 38a, the cleaning-liquid discharging nozzle 87 ejects the deionized water to the wafers W in rotation, thereby performing the water washing process. Next, the wafers W is subjected to the drying process using N2-gas. Also in the water-washing process and the drying process, as mentioned above, when the supply voltage for the servo motor 30 of the rotor 36 drops, the servo motor 30 is controlled corresponding to the voltage drop during driving of the motor, so as to restrain damage on the wafers W and suppress increasing of the driving (processing) period.

While the wafers W are processed in the cleaning unit 3 as mentioned above, it is executed in the wafer transfer unit 4 to move the wafer transfer mechanism 16 having no wafer W so that the transfer tweezers 17a can access the foup F2 mounted on the foup stage 2b. Thus, as similar to the unloading of the wafers W from the foup F1, the wafers W accommodated in the foup F2 are transferred to the transfer tweezers 17a. Next, it is carried out to move the wafer transfer mechanism 16 so that the transfer tweezers 17b having no wafer W can access the rotor 36 through the window part 25a. Then, the transfer tweezers 17a are supporting unprocessed wafers W.

After completing the cleaning process of the wafers W in the cleaning unit 3, by driving the rotor rotation mechanism 31 carrying the wafers W, the horizontal driving mechanism 34 and so on, the wafers W are moved to a position enabling them to be transferred between the transfer tweezers 17a, 17b and the rotor 36. After opening the window part 25a, the transfer tweezers 17b first approach the rotor 36 to receive the wafers W carried by the rotor 36. In succession, by operating the rotation mechanism 22, the table 21 is rotated by 180 degrees so that the transfer tweezers 17a can access the rotor 36. Then, the unprocessed wafers W are delivered from the transfer tweezers 17a to the rotor.

As for the wafers W of the foup F2 held by the rotor 36, they are subjected to a cleaning process having the same steps as the cleaning process applied to the wafers W of the foup F1. In the wafer transfer mechanism 16, during the above cleaning process, the transfer tweezers 17b approaches the foup F1 and then, the wafers W after the cleaning process are delivered to the foup F1. Subsequently, the wafer transfer mechanism 16 is brought into condition that the transfer tweezers 17b can access the rotor 36. The wafers W for the foup F2 after the cleaning process are accommodated in the foup F2 in the same procedures as those of accommodating the wafers W for the foup F1 into the foup F1. In this way, the cleaning operation of the wafers W accommodated in the foups F1, F2 is completed.

Although the servo motor (rotation driving apparatus) of the present invention is applied to a rotation driving source of the rotor 36 in the above-mentioned embodiment, such a servo motor dealing with a voltage drop is also applicable to an apparatus (mechanism) having the other rotation driving mechanism except the rotor 36, for example, the linear driving mechanism 19, the rotation mechanism 22 or the like.

Additionally, although the rotation driving apparatus of the invention is applied to a batch-type wafer cleaning system in the above-mentioned embodiment, the rotation driving apparatus of the invention is applicable to the other structure employing a rotation driving mechanism (apparatus), for example, sheet-type wafer cleaning apparatus, coating/developing apparatus, semiconductor manufacturing apparatus having a rotation driving apparatus or the like. Moreover, needless to say, the rotation driving apparatus of the invention is applicable to a processing apparatus for the other substrate but wafer, such as LCD substrate.

The invention claimed is:

1. A rotation driving apparatus having a motor at least rotating at a high speed and a low speed, a torque generating circuit for generating a torque of the motor by a supply voltage from a power source, a motor control circuit for controlling rotation of the motor, a rotation detector for detecting a rotating speed of the motor and transmitting a detection signal to the motor control circuit and controller for delivering the rotating speed of the motor and a number of revolutions thereof to and from the motor control circuit, wherein the torque generating circuit includes a voltage detector for detecting a level of the supply voltage and a period of voltage drop, the voltage detector transmitting a voltage-drop information to the controller, the controller memorizes power-recovery information including a voltage drop and a period thereof under an instantaneous blackout recoverable within a predetermined period, and rotation-control pattern information of the motor corresponding to the power-recovery information, in advance, and the controller controls rotation of the motor upon comparing the voltage-drop information, the power-recovery information, and the rotation-control pattern information of the motor with each other, the rotation-control pattern information of the motor has ranges of an accelerating rotation, a constant high-speed rotation and a decelerating rotation, such that when the voltage detector detects a voltage drop during the accelerating rotation of the motor, the controller outputs control signals for: decelerating rotation of the motor; next rotating the motor at a constant speed; and after the power recovery, accelerating rotation of the motor.

2. A rotation driving apparatus having a motor at least rotating at a high speed and a low speed, a torque generating circuit for generating a torque of the motor by a supply voltage from a power source, a motor control circuit for controlling rotation of the motor, a rotation detector for detecting a rotating speed of the motor and transmitting a detection signal to the motor control circuit and controller for delivering the rotating speed of the motor and a number of revolutions thereof to and from the motor control circuit, wherein the torque generating circuit includes a voltage detector for detecting a level of the supply voltage and a period of voltage drop, the voltage detector transmitting a voltage-drop information to the controller the controller memorizes power-recovery information including a voltage drop and a period thereof under an instantaneous blackout recoverable within a predetermined period, and rotation-control pattern information of the motor corresponding to the power-recovery information, in advance, and the controller controls rotation of the motor upon comparing the voltage-drop information, the power-recovery information, and the rotation-control pattern information of the motor with each other, the rotation-control pattern information of the motor has ranges of an accelerating rotation, a constant high-speed rotation and a decelerating rotation, such that when the voltage detector detects a voltage drop during the accelerating rotation of the motor, the control means outputs control signals for: decelerating rotation of the motor; next rotating the motor at a constant speed; and after the power recovery, compensating the accelerating rotation of the motor at the voltage drop.

3. The rotation driving apparatus as claimed in claim 2, wherein the accelerating rotation of the motor after the power recovery is carried out by increasing an acceleration rate of the accelerating rotation of the motor in the rotation-control pattern toward a finish time of the accelerating rotation of the motor in the set up rotation-control pattern.

4. The rotation driving apparatus as claimed in claim 2, wherein it is set up that the accelerating rotation of the motor after the power recovery conforms to the accelerating rotation of the motor of the set up rotation-control pattern and that a period of the constant high-speed rotation of the motor is equal to a period of the constant high speed rotation of the motor in the set up rotation-control pattern, and a deceleration rate of the decelerating rotation of the motor is increased so that a finish time of the decelerating rotation of the motor coincides with a finish time of the decelerating rotation of the motor in the set up rotation-control pattern.

5. The rotation driving apparatus as claimed in claim 2, wherein the accelerating rotation of the motor after the power recovery is maintained to a higher speed than a speed of the constant high-speed rotation of the motor in the set up rotation-control pattern, and after rotating the motor at the higher speed, the motor is decelerated so as to coincide with a finish time of the decelerating rotation of the motor in the set up rotation-control pattern.

6. A rotation driving apparatus having a motor at least rotating at a high speed and a low speed, a torque generating circuit for generating a torque of the motor by a supply voltage from a power source, a motor control circuit for controlling rotation of the motor, a rotation detector for detecting a rotating speed of the motor and transmitting a detection signal to the motor control circuit and controller for delivering the rotating speed of the motor and a number of revolutions thereof to and from the motor control circuit, wherein the torque generating circuit includes a voltage detector for detecting a level of the supply voltage and a period of voltage drop, the voltage detector transmitting a voltage-drop information to the controller, the controller memorizes power-recovery information including a voltage drop and a period thereof under an instantaneous blackout recoverable within a predetermined period, and rotation-control pattern information of the motor corresponding to the power-recovery information, in advance, and the controller controls the rotation of the motor upon comparing the voltage-drop information, the power-recovery information and the rotation-control pattern information of the motor with each other, such that when the voltage detector detects a voltage drop during the accelerating rotation of the motor, the control means outputs control signals for: decelerating rotation of the motor; next rotating the motor at a constant speed; and stopping rotation of the motor if time has passed a period of the instantaneous blackout.

7. A rotation driving apparatus having a motor at least rotating at a high speed and a low speed, a torque generating circuit for generating a torque of the motor by a supply voltage from a power source, a motor control circuit for controlling rotation of the motor, a rotation detector for detecting a rotating speed of the motor and transmitting a detection signal to the motor control circuit and a controller for delivering the rotating speed of the motor and a number of revolutions thereof to and from the motor control circuit, wherein the torque generating circuit includes a voltage detector for detecting a level of the supply voltage and a period of voltage drop, the voltage detector transmitting voltage-drop information to the controller, the controller memorizes power-recovery information including a voltage drop and a period thereof under an instantaneous blackout recoverable within a predetermined period, and rotation-control pattern information of the motor corresponding to the power-recovery information, in advance, and the controller compares the voltage-drop information and the power-recovery information to determine whether the instantaneous blackout recoverable within a predetermined period has occurred, and controls the rotation of the motor on the basis of the rotation-control pattern information of the motor corresponding to the power-recovery information when the instantaneous blackout has occurred.

8. The rotation driving apparatus as claimed in claim 7, wherein when the voltage detector detects a voltage drop during the accelerating rotation of the motor, the controller outputs control signals for decelerating rotation of the motor and subsequently rotating the motor at a constant speed.

9. The rotation driving apparatus as claimed in claim 7, wherein the rotation-control pattern information of the motor has ranges of an accelerating rotation, a constant high-speed rotation and a decelerating rotation, wherein when the voltage detector detects a voltage drop during the accelerating rotation of the motor, the controller outputs control signals for: decelerating rotation of the motor; next rotating the motor at a constant speed; and after the power recovery, accelerating rotation of the motor.

10. The rotation driving apparatus as claimed in claim 7, wherein the rotation-control pattern information of the motor has ranges of an accelerating rotation, a constant high-speed rotation and a decelerating rotation, wherein when the voltage detector detects a voltage drop during the accelerating rotation of the motor, the control means outputs control signals for: decelerating rotation of the motor; next rotating the motor at a constant speed; and after the power recovery, compensating the accelerating rotation of the motor at the voltage drop.

11. The rotation driving apparatus as claimed in claim 10, wherein the accelerating rotation of the motor after the power recovery is carried out by increasing an acceleration rate of the accelerating rotation of the motor in the rotation-control pattern toward a finish time of the accelerating rotation of the motor in the set up rotation-control pattern.

12. The rotation driving apparatus as claimed in claim 10, wherein it is set up that the accelerating rotation of the motor after the power recovery conforms to the accelerating rotation of the motor of the set up rotation-control pattern and that a period of the constant high-speed rotation of the motor is equal to a period of the constant high-speed rotation of the motor in the set up rotation-control pattern, and a deceleration rate of the decelerating rotation of the motor is increased so that a finish time of the decelerating rotation of the motor coincides with a finish time of the decelerating rotation of the motor in the set up rotation-control pattern.

13. The rotation driving apparatus as claimed in claim 10, wherein the accelerating rotation of the motor after the power recovery is maintained at a higher speed than a speed of the constant high-speed rotation of the motor in the set up rotation-control pattern, and after rotating the motor at the higher speed, the motor is decelerated so as to coincide with a finish time of the decelerating rotation of the motor in the set up rotation-control pattern.

14. The rotation driving apparatus as claimed in claim 7, wherein when the voltage detector detects a voltage drop during the accelerating rotation of the motor, the control means outputs control signals for: decelerating rotation of the motor; next rotating the motor at a constant speed; and stopping rotation of the motor if time has passed a period of the instantaneous blackout.

15. A rotation driving apparatus having a motor at least rotating at a high speed and a low speed, a torque generating circuit for generating a torque of the motor by a supply voltage from a power source, a motor control circuit for controlling rotation of the motor, a rotation detector for detecting a rotating speed of the motor and transmitting a detection signal to the motor control circuit, and a controller for delivering the rotating speed of the motor and a number of revolutions thereof to and from the motor control circuit, wherein the torque generating circuit includes a voltage detector for detecting a level of the supply voltage and a period of voltage drop, the voltage detector transmitting voltage-drop information to the controller, the controller memorizes power-recovery information including a voltage drop and a period thereof under an instantaneous blackout recoverable within a predetermined period, and rotation-control pattern information of the motor corresponding to the power-recovery information, in advance, and the motor control circuit compares the voltage-drop information and the power-recovery information to determine whether the instantaneous blackout recoverable within a predetermined period has occurred, and controls the rotation of the motor on the basis of the rotation-control pattern information of the motor corresponding to the power-recovery information when the instantaneous blackout has occurred.

16. A rotation driving method for a rotation driving apparatus having a motor at least rotating at a high speed and a low speed, a torque generating circuit for generating a torque of the motor by a supply voltage from a power source, and a voltage detector arranged in the torque generating circuit to detect a level of the supply voltage and a period of a voltage drop, comprising the steps of:

memorizing power-recovery information including the voltage drop and the period of the voltage drop under an instantaneous blackout recoverable within a predetermined period, and rotation-control pattern information of the motor corresponding to the power-recovery information, in advance, and obtaining voltage-drop information detected by the voltage detector and further comparing the voltage-drop information and the power-recovery information to determine whether the instantaneous blackout recoverable within a predetermined period has occurred, and controlling the rotation of the motor on the basis of the rotation-control pattern information of the motor corresponding to the power-recovery information when the instantaneous blackout has occurred.

17. The rotation driving method as claimed in claim 16, wherein the step of comparing the voltage-drop information, the power-recovery information and the rotation-control pattern information of the motor with each other is carried out by a controller configured to give and receive both a rotating speed of the motor and a number of revolutions thereof to and from a motor control circuit for controlling the motor through the torque generating circuit.

18. The rotation driving method as claimed in claim 16, wherein the step of comparing the voltage-drop information, the power-recovery information and the rotation-control pattern information of the motor with each other is carried out by the motor control circuit for controlling the motor through the torque generating circuit.

* * * * *